US009523871B2

United States Patent
Kitamura et al.

(10) Patent No.: US 9,523,871 B2
(45) Date of Patent: Dec. 20, 2016

(54) SEMICONDUCTOR OPTICAL MODULATOR AND METHOD FOR MANUFACTURING SEMICONDUCTOR OPTICAL MODULATOR

(71) Applicant: SUMITOMO ELECTRIC INDUSTRIES, LTD., Osaka (JP)

(72) Inventors: Takamitsu Kitamura, Fujisawa (JP); Hideki Yagi, Machida (JP); Daisuke Kimura, Yokohama (JP); Hirohiko Kobayashi, Machida (JP); Masataka Watanabe, Kamakura (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/796,770

(22) Filed: Jul. 10, 2015

(65) Prior Publication Data
US 2016/0011439 A1  Jan. 14, 2016

(30) Foreign Application Priority Data
Jul. 14, 2014 (JP) ................. 2014-143793

(51) Int. Cl.
*G02F 1/025* (2006.01)
*G02F 1/21* (2006.01)
*G02F 1/225* (2006.01)

(52) U.S. Cl.
CPC .............. *G02F 1/025* (2013.01); *G02F 1/218* (2013.01); *G02F 1/2255* (2013.01)

(58) Field of Classification Search
None
See application file for complete search history.

(56) References Cited

U.S. PATENT DOCUMENTS

| 6,150,667 A * | 11/2000 | Ishizaka | G02F 1/025 257/184 |
| 6,310,700 B1 * | 10/2001 | Betts | B82Y 10/00 359/2 |
| 7,024,057 B2 * | 4/2006 | Li | B82Y 20/00 385/1 |
| 2004/0062506 A1 * | 4/2004 | Komura | G02B 6/125 385/131 |

(Continued)

FOREIGN PATENT DOCUMENTS

JP  2004-53830  2/2004

*Primary Examiner* — Mike Stahl
(74) *Attorney, Agent, or Firm* — Smith, Gambrell & Russell, LLP.

(57) ABSTRACT

A semiconductor optical modulator includes a substrate having a principal surface; a waveguide disposed on the principal surface of the substrate, the waveguide extending in a first direction; a first electrode disposed on the waveguide, the first electrode being in contact with an upper surface of the waveguide; a first wiring connected to the first electrode, the first wiring extending in a second direction intersecting the first direction; a build-up portion connected to the first wiring; a second wiring connected to the build-up portion, the second wiring extending in a plane parallel to the principal surface of the substrate; and a resin layer disposed on the substrate, the resin layer embedding the first wiring and the build-up portion. The build-up portion extends along a third direction, the third direction intersecting perpendicularly to the principal surface of the substrate. The second wiring is disposed on the resin layer.

12 Claims, 17 Drawing Sheets

(56) References Cited

U.S. PATENT DOCUMENTS

| | | | | |
|---|---|---|---|---|
| 2004/0120626 A1* | 6/2004 | Kornrumpf | ............. | G02F 1/225 385/2 |
| 2014/0294335 A1* | 10/2014 | Yagi | ........................ | G02F 1/025 385/2 |
| 2014/0341496 A1* | 11/2014 | Kim | ........................ | G02F 1/011 385/1 |
| 2015/0023627 A1* | 1/2015 | Kimura | ................. | G02F 1/2257 385/3 |
| 2016/0026063 A1* | 1/2016 | Yagi | ..................... | G02F 1/2255 385/2 |

* cited by examiner

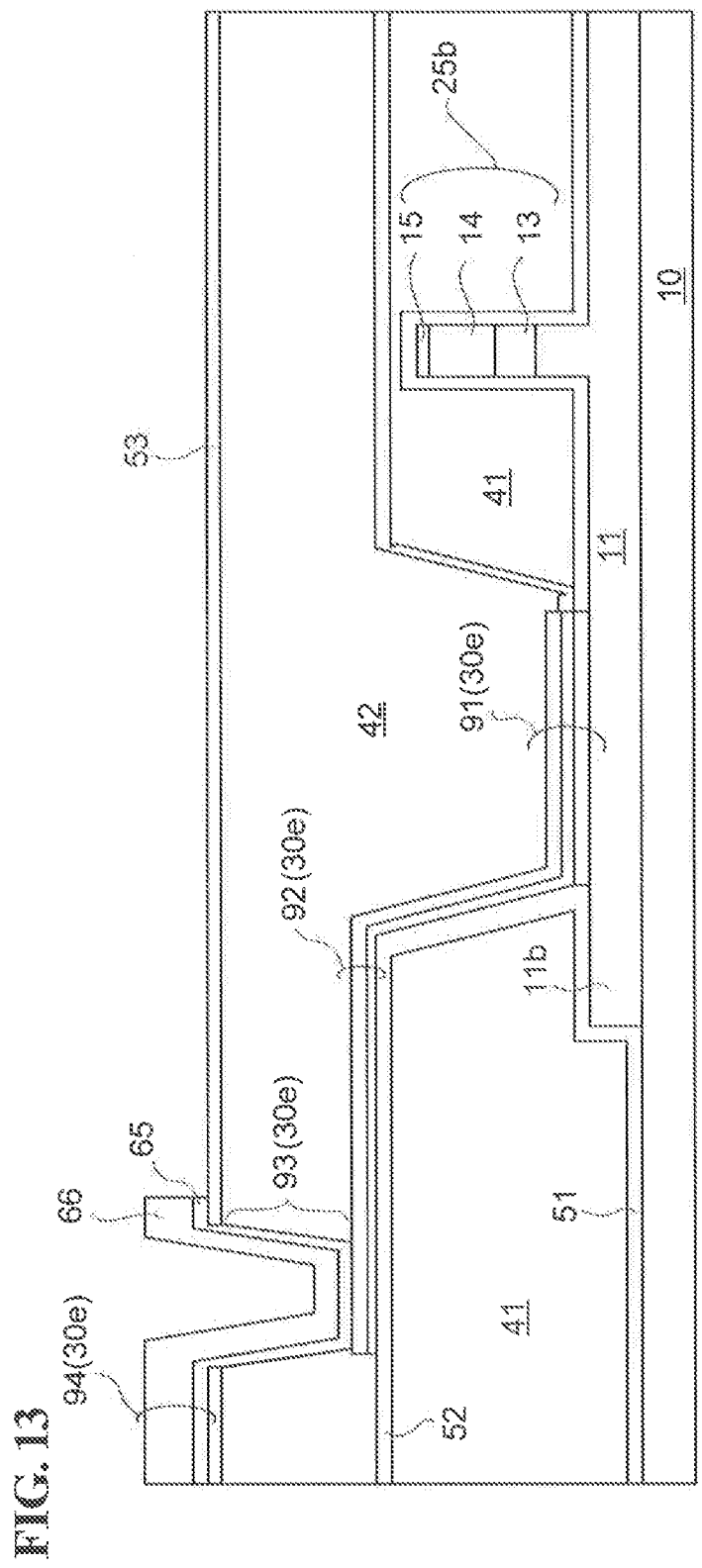

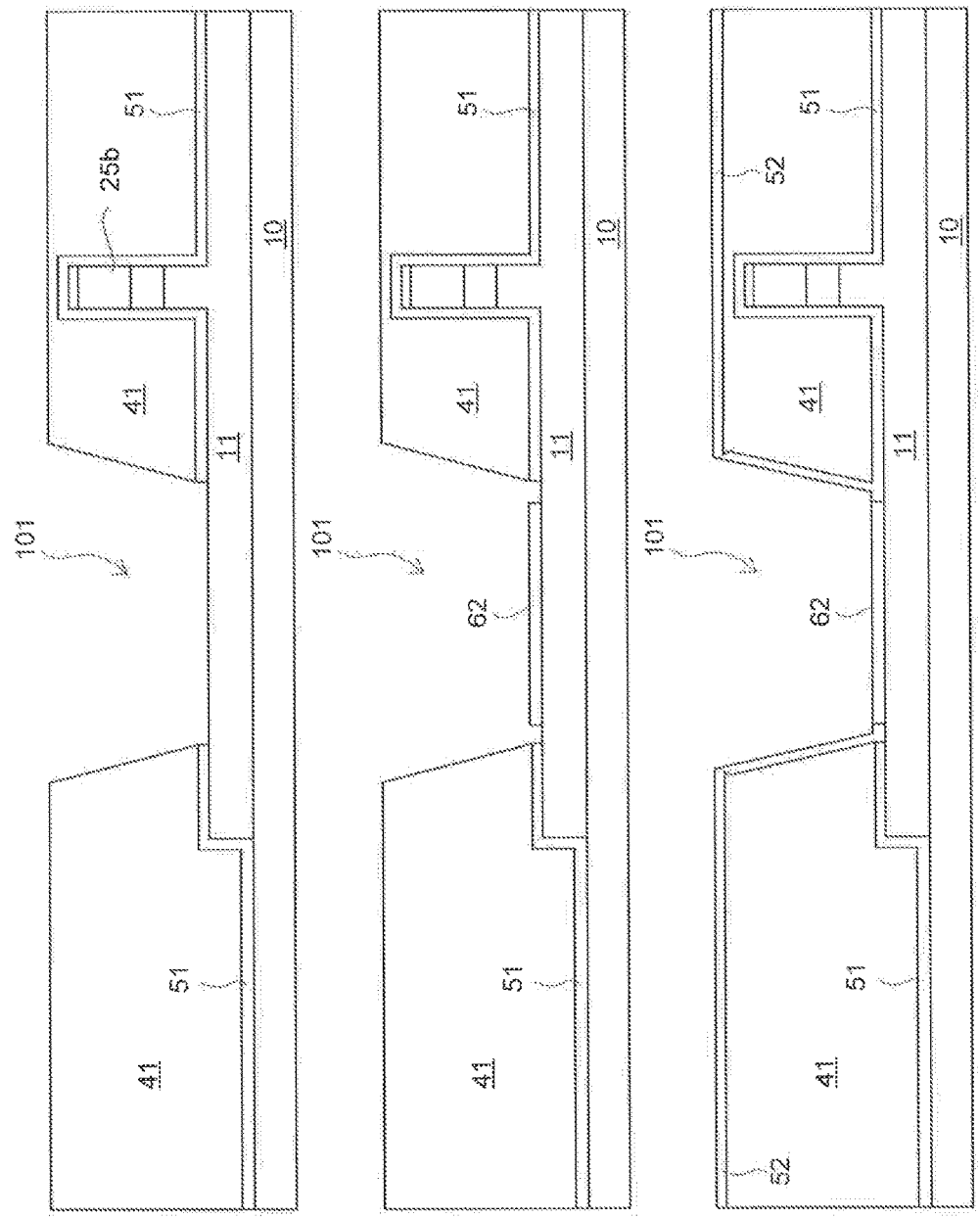

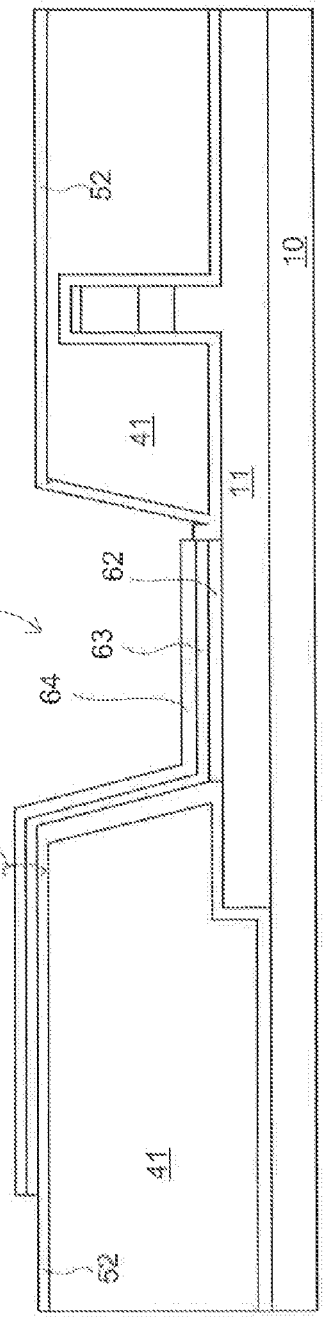
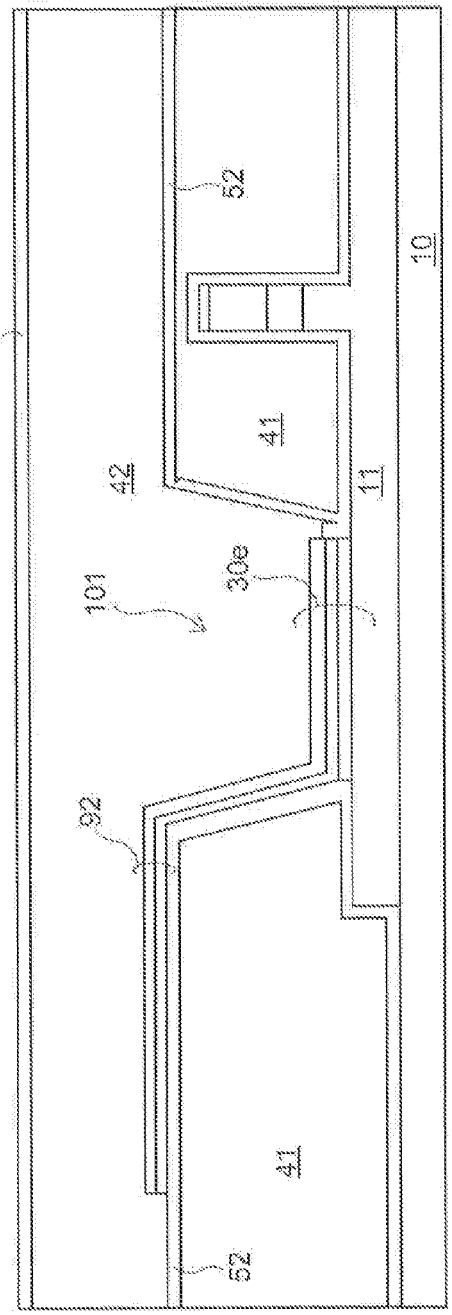

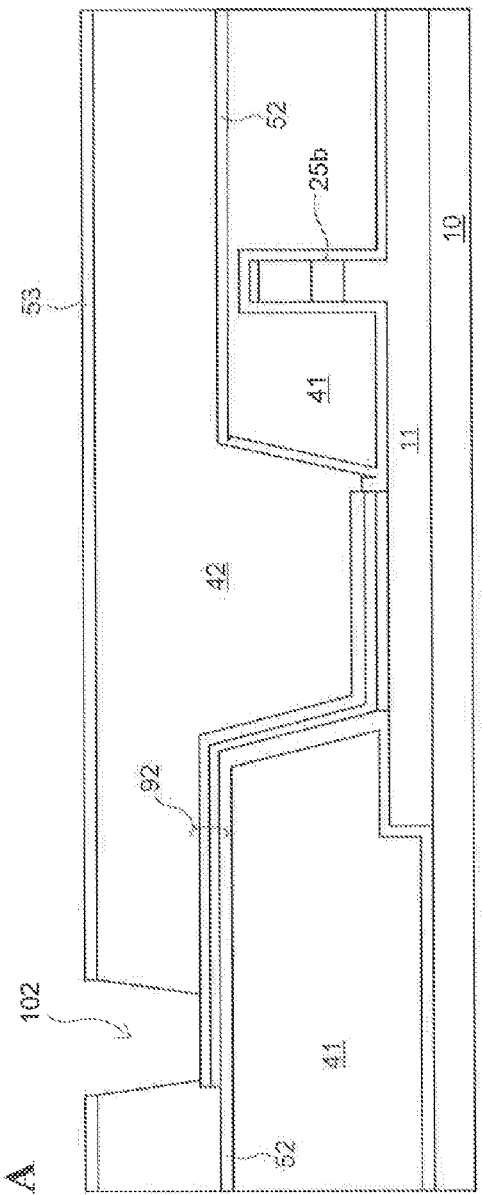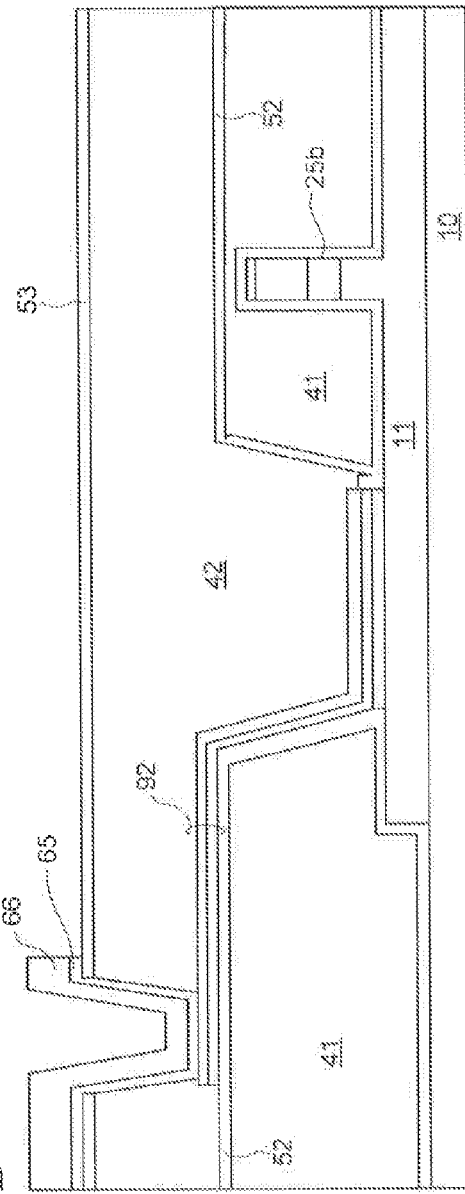

SEMICONDUCTOR OPTICAL MODULATOR AND METHOD FOR MANUFACTURING SEMICONDUCTOR OPTICAL MODULATOR

BACKGROUND OF THE INVENTION

1. Field of the Invention

The present invention relates to a semiconductor optical modulator and a method for manufacturing a semiconductor optical modulator.

2. Description of the Related Art

Japanese Unexamined Patent Application Publication No. 2004-53830 discloses a Mach-Zehnder optical modulator disposed on a semiconductor substrate. The Mach-Zehnder optical modulator according to Japanese Unexamined Patent Application Publication No. 2004-53830 includes a phase modulation electrode disposed on an optical waveguide and a slot-line electrode disposed apart from the optical waveguide. The phase modulation electrode and the slot-line electrode are connected together with an air-bridge wiring. The air-bridge wiring has a hollow space therebelow.

SUMMARY OF THE INVENTION

Since the air-bridge wiring described in Japanese Unexamined Patent Application Publication No. 2004-53830 has a hollow space therebelow; the wiring, if it is too long, is easy to sag down by its self-weight. Sagging of the wiring causes the wiring to pull the optical waveguide, so that the optical waveguide deteriorates over time. If, on the other hand, the wiring is too short, the slot-line electrode and the optical waveguide are positioned close to each other. This close positioning of the electrode and the wave guide causes parasitic capacitance therebetween. The parasitic capacitance degrades the modulation characteristics of the modulator. It is difficult to obtain a modulator including the air-bridge wiring having high reliability and high frequency modulation characteristics.

A semiconductor optical modulator according to an aspect of the present invention includes a substrate having a principal surface; a waveguide disposed on the principal surface of the substrate, the waveguide extending in a first direction; a first electrode disposed on the waveguide, the first electrode being in contact with an upper surface of the waveguide; a first wiring connected to the first electrode, the first wiring extending in a second direction intersecting the first direction; a build-up portion connected to the first wiring; a second wiring connected to the build-up portion, the second wiring extending in a plane parallel to the principal surface of the substrate; and a resin layer disposed on the substrate, the resin layer embedding the first wiring and the build-up portion. The build-up portion extends along a third direction, the third direction intersecting the principal surface of the substrate. The second wiring is disposed on the resin layer.

In this semiconductor optical modulator, as the resin layer is disposed between the substrate and the second wiring, the second wiring is supported by the resin layer. The second wiring is prevented from sagging by its self-weight. The resin layer embeds the first wiring and the build-up portion. The first wiring and the build-up portion is prevented from sagging by their self weights. In addition, the first wiring extends in the second direction that intersects with the first direction in which the waveguide extends. The build-up portion connects to the first wiring. The build-up portion extends in the third direction intersecting the principal surface of the substrate. The second wiring connects to the build-up portion. The build-up portion and the second wiring are disposed apart from the waveguide. The separation of the build-up portion and the second wiring from the waveguide avoid the parasitic capacitance therebetween.

A method for manufacturing a semiconductor optical modulator according to an aspect of the invention includes the steps of: forming a waveguide on a principal surface of a substrate, the waveguide extending in a first direction; forming a first resin layer on the principal surface of the substrate, the first resin layer embedding the waveguide; forming a first opening in the first resin layer on the waveguide by etching the first resin layer; forming a first electrode in the first opening, the first electrode being in contact with an upper surface of the waveguide; forming a first wiring on the first electrode and on the first resin layer, the first wiring having a portion extending in a second direction intersecting the first direction; forming a second resin layer on the first wiring and on the first resin layer, the second resin layer embedding the first wiring; forming a second opening in the second resin layer on the first wiring by etching the second resin layer, the second opening extending in a third direction intersecting the principal surface of the substrate; and forming a build-up portion in the second opening, and a second wiring on the second resin layer, simultaneously.

With this method, the second wiring is formed on the second resin layer, and the waveguide is embedded under the first resin layer. The second resin layer is disposed on the first resin layer. The build-up portion and the first wiring embedded in the second resin layer connects the second wiring and the waveguide. The build-up portion is formed so as to extend in the third direction leaving from the waveguide. The first wiring is formed so as to have a portion extending in the second direction leaving from the waveguide. The second wiring is thus spaced apart from the waveguide. Thus, a modulator having desirable characteristics with which the parasitic capacitance is minimized is obtained. In addition, with this method, the second wiring, the build-up portion and the first wiring supported by the resin layer are obtained. In this modulator, the wirings are prevented from sagging by their respective weights. Thus, the waveguide is prevented from being pulled owing to sagging of the wirings.

BRIEF DESCRIPTION OF THE DRAWINGS

FIG. 13 is a cross-sectional view of the semiconductor optical modulator taken along the line XIII-XIII of FIG. 12.

FIGS. 15A to 15C are diagrams for illustrating main steps of the method for manufacturing a semiconductor optical modulator according to the second embodiment.

FIGS. 16A and 16B are diagrams for illustrating main steps of the method for manufacturing a semiconductor optical modulator according to the second embodiment.

FIGS. 17A and 17B are diagrams for illustrating main steps of the method for manufacturing a semiconductor optical modulator according to the second embodiment.

DESCRIPTION OF THE PREFERRED EMBODIMENTS

Figure 1:
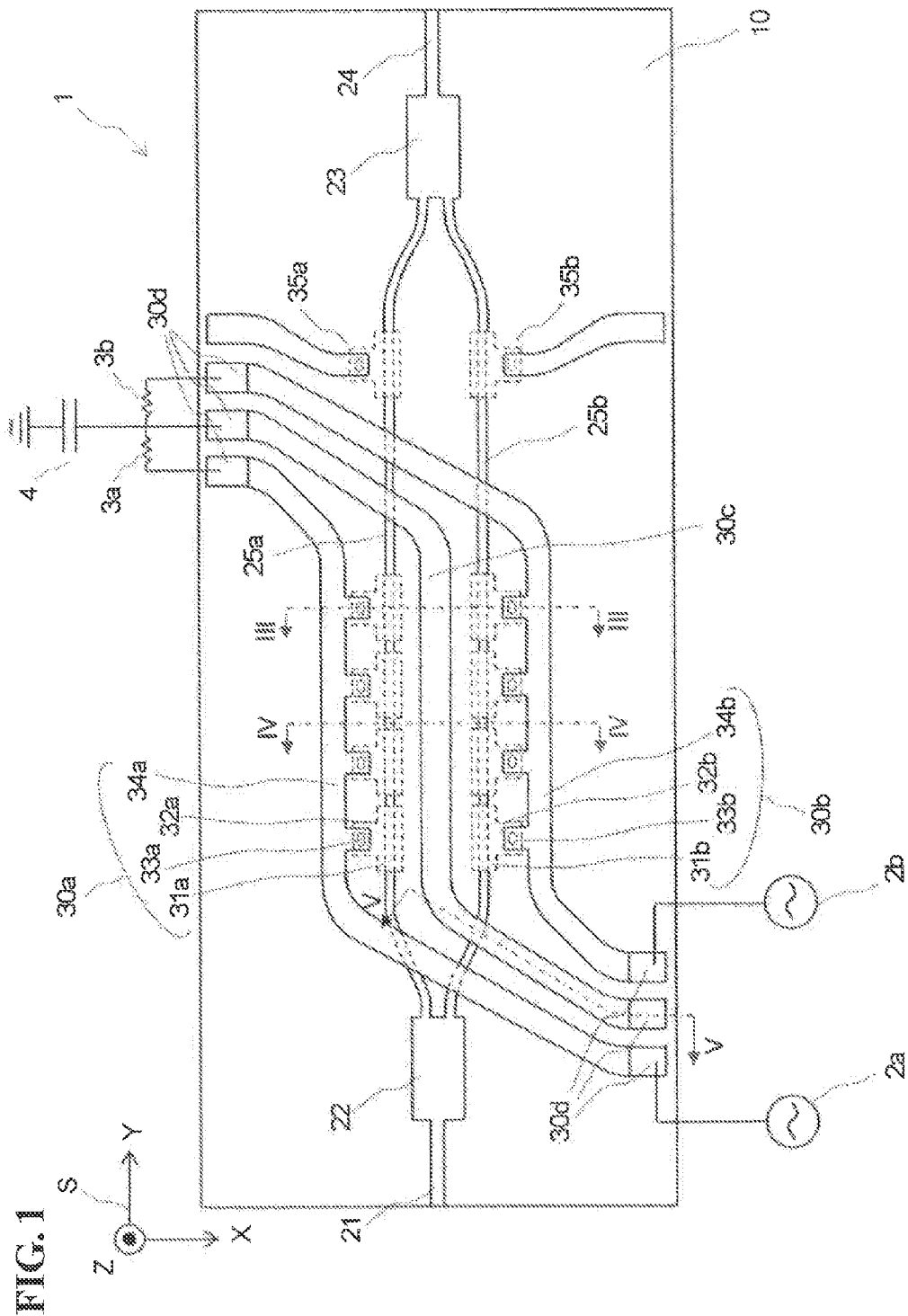
FIG. 1 is a plan view of a semiconductor optical modulator according to a first embodiment.

A semiconductor optical modulator according to an aspect of the invention includes a substrate having a principal surface; a waveguide disposed on the principal surface of the substrate, the waveguide extending in a first direction; a first electrode connected to an upper surface of the waveguide; a first wiring connected to the first electrode, the first wiring having a portion extending in a second direction that intersects with the first direction; a build-up portion connected to the first wiring; a second wiring connected to the build-up portion, the second wiring extending in a plane parallel to the principal surface of the substrate; and a resin layer disposed on the substrate, the resin layer embedding the first wiring and the build-up portion. The build-up portion extends along a third direction, the third direction intersecting the principal surface of the substrate. The second wiring is disposed on the resin layer.

In this semiconductor optical modulator, as the resin layer is disposed between the substrate and the second wiring, the second wiring is supported by the resin layer. The second wiring is prevented from sagging by its self-weight. The resin layer covers and supports the first wiring and the build-up portion. The first wiring and the build-up portion is prevented from sagging by their self-weights. In addition, the first wiring extends in the second direction that intersects with the first direction in which the waveguide extends. The build-up portion and the second wiring are placed apart from the waveguide in the second direction. The build-up portion extending in the third direction connects the first wiring and the second wiring together. The second wiring is placed apart from the waveguide in the third direction. The separation of the wirings from the waveguide minimizes the parasitic capacitance between each wiring and the waveguide. The modulator retains fine modulation characteristics. Furthermore, the first wiring and the second wiring are disposed in different planes separated by the resin layer. The first wiring and the second wiring thus can be three-dimensionally disposed, whereby the freedom of wiring design is enhanced.

In the semiconductor optical modulator according to another aspect of the invention, the build-up portion may be arranged on the first wiring by being spaced apart from the first electrode.

The semiconductor optical modulator according to another aspect of the invention, may further include a couple of said waveguides disposed on the substrate, the pair of said waveguides extending in the first direction; an optical coupler disposed on the substrate, the optical coupler optically connecting the pair of waveguides; and a couple of said second wirings disposed on the resin layer, the pair of said second wirings extending in the first direction. The couple of said waveguides are arranged between the couple of said second wirings.

The semiconductor optical modulator according to another aspect of the invention may further include a plurality of first electrodes disposed on the waveguide; a plurality of first wirings connected to the corresponding first electrodes; and a plurality of build-up portions connected to the corresponding first electrodes. The plurality of first electrodes are spaced apart from each other. The plurality of build-up portions are connected with the second wiring.

In the semiconductor optical modulator according to another aspect of the invention, the resin layer may include a first resin layer disposed between the first wiring and the substrate, and a second resin layer disposed between the first resin layer and the second wiring. The first resin layer may embed the waveguide. The second resin layer may embed the first electrode and the build-up portion.

The semiconductor optical modulator according to another aspect of the invention may further include a first insulating film composed of an inorganic silicon compound. The first insulating film may be disposed between the first resin layer and the second resin layer. The first wiring may be disposed on the first insulating film.

The semiconductor optical modulator according to another aspect of the invention may further include a second insulating film composed of an inorganic silicon compound. The second insulating film may be disposed on the second resin layer. The second wiring may be disposed on the second insulating film.

In the semiconductor optical modulator according to another aspect of the invention, the build-up portion may include a barrier metal layer and an inner metal layer. The barrier metal layer is in contact with the resin layer, and the inner metal layer is in contact with an inner surface of the barrier metal layer. The barrier metal layer is made of a material that adheres well to the resin layer and the inner metal layer is made of a highly electrically-conductive material. Thus, the build-up portion surrounded with the resin layer can have high adhesion to the resin layer and a low electrical resistance.

In the semiconductor optical modulator according to another aspect of the invention, the waveguide may include a lower contact layer disposed on the principal surface of the substrate, a lower cladding layer disposed on the lower contact layer, a core layer disposed on the lower cladding layer, and an upper cladding layer disposed on the core layer. The lower contact layer may have a larger width than a width of the core layer.

The semiconductor optical modulator according to another aspect of the invention may further include an isolation mesa disposed on the principal surface of the substrate, the isolation mesa including the lower contact layer; a second electrode connected to an upper surface of the isolation mesa; a third wiring connected to the second electrode; a ground build-up portion connected to the third wiring, and a fourth wiring connected to the ground build-up portion. The ground build-up portion extends along a fourth direction, the fourth direction intersecting the principal surface of the substrate. The fourth wiring is disposed on the resin layer.

A method for manufacturing a semiconductor optical modulator according to an aspect of the invention includes steps of: forming a waveguide on a principal surface of a substrate, the waveguide extending in a first direction; forming a first resin layer on the principal surface of the substrate, the first resin layer embedding the waveguide; forming a first opening in the first resin layer on the waveguide by etching the first resin layer; forming a first electrode in the first opening, the first electrode being in contact with an upper surface of the waveguide; forming a first wiring on the first electrode and on the first resin layer, the first wiring having a portion extending in a second direction intersecting the first direction; forming a second resin layer on the first wiring and on the first resin layer, the second resin layer embedding the first wiring; forming a second opening in the second resin layer on the first wiring by etching the second resin layer, the second opening extending in a third direction intersecting the principal surface of the substrate; and forming a build-up portion in the second opening, and a second wiring on the second resin layer, simultaneously.

With this method, the waveguide is embedded in the first resin layer, and the second wiring is formed on the second resin layer. The second resin layer is disposed on the first resin layer. The build-up portion extending in the third direction connects the first wiring and the second wiring. The third direction intersects the principal surface of the substrate. The second wiring is thus spaced apart from the waveguide. The first wiring is formed so as to have a portion extending in the second direction leaving from the waveguide. The build-up portion is thus space apart from the waveguide. Thus, the parasitic capacitance between each wiring and the corresponding waveguide is minimized and a modulator retains its modulation characteristics. In addition, this method attains a structure in which the first resin layer supports the first wiring and the second resin layer supports the build-up portion and the second wiring. Thus, the first wiring, the second wiring, and the build-up portion are prevented from being deformed by their respective weights. Thus, the stress attributable to deformation does not occur, the stress transmitted to the waveguide is reduced, whereby the modulator retains desirable reliability.

In addition, in a method for manufacturing a semiconductor optical modulator according to another aspect of the invention, in the step of forming the second opening, the second opening has a width smaller than a width of the first wiring. When the width of the bottom surface of the second opening is set smaller than the width of the first wiring, etching of the second resin layer is stopped at the surface of the first wiring in the step of forming the second opening. This structure allows a build-up portion to be formed in a desired shape even when a thick second resin layer is used.

In the method for manufacturing a semiconductor optical modulator according to another aspect of the invention, in the step of forming the second opening, the second opening is disposed on the first wiring at the far end from the first electrode. This method allows a build-up portion to be formed on the first wiring at the far end from the first electrode. This method can provide the modulator with reduced parasitic capacitance.

Now a semiconductor optical modulator according to an embodiment is described. A semiconductor optical modulator according to this embodiment is, for example, a Mach-Zehnder modulator.

First Embodiment

FIG. 1 is a top view of a Mach-Zehnder modulator 1 according to an embodiment of the invention. The Mach-Zehnder modulator 1 includes an input waveguide 21, two optical couplers 22 and 23, an output waveguide 24, and two arm waveguides 25a and 25b. The input waveguide 21 is optically coupled to ends of the arm waveguides 25a and 25b via the optical coupler 22. The other ends of the arm waveguides 25a and 25b are optically coupled to the output waveguide 24 via the optical coupler 23. The waveguides 21, 24, 25a and 25b are disposed on a principal surface of a semiconductor substrate 10. The optical couplers 22 and 23 are disposed on the principal surface of the substrate 10. FIG. 1 illustrates orthogonal coordinate axes S. The z-axis of the orthogonal coordinate axes S is a direction perpendicular to the principal surface of the substrate 10. The arm waveguides 25a and 25b extend in a first direction. The first direction is parallel to the direction of the y-axis of the orthogonal coordinate axes S.

The Mach-Zehnder modulator 1 includes two traveling-wave electrodes 30a and 30b and one ground electrode 30c. The electrodes 30a, 30b and 30c have a portion extending along the y-axis of the coordinate axes S. Each of the electrodes 30a, 30b and 30c has electrode pads 30d on its both ends. An electric signal source 2a is connected to one electrode pad 30d of the electrode 30a. A termination resistor 3a is connected to the other electrode pad 30d of the electrode 30a. Similarly, an electric signal source 2b and a termination resistor 3b are connected to the respective electrode pads 30d of the electrode 30b. The electrode 30c is connected to the electrodes 30a and 30b via the resistors 3a and 3b. The electrode 30c is grounded via a capacitor 4. The electrodes 30a, 30b and 30c are electrically coupled to the arm waveguides 25a and 25b.

In the Mach-Zehnder modulator 1, laser light enters into the input waveguide 21. The laser light is bifurcated by the optical coupler 22 and led to the arm waveguides 25a and 25b. The laser light passing through the arm waveguides 25a and 25b is subjected to phase modulation by the applied voltage signals from the electrodes 30a, 30b and 30c. The laser light is multiplexed by the optical coupler 23 and is output from the output waveguide 24.

The electrode 30a includes multiple first electrodes 31a, multiple first wirings 32a, multiple build-up portions 33a, and a second wiring 34a. The first electrodes 31a are disposed on the arm waveguide 25a. The first electrodes 31a are disposed so as to be spaced apart from one another. The number of the first electrodes 31a is, for example, 18. FIG. 1 illustrates only four first electrodes 31a for simplicity. The number of the first electrodes 31a is selected from a range of, for example, 3 to 100. To each first electrode 31a, the corresponding first wiring 32a, the corresponding build-up portion 33a are connected. The second wiring 34a connects the plurality of the build-up portions 33a. As the first electrodes 31a are connected to the waveguide at a plurality of points, the stress from the wiring on the arm waveguide is dispersed in the longitudinal direction of the arm waveguide.

The length of each first electrode 31a is 150 µm. The space between adjacent first electrodes is 50 µm. The electrode 30b similarly includes multiple first electrodes 31b, multiple first wirings 32b, multiple build-up portions 33b, and a second wiring 34b.

A bias electrode 35a is disposed on the arm waveguide 25a. The length of the bias electrode 35a is 750 μm. The distance between the first electrodes 31a and the bias electrode 35a is 1 mm. The bias electrode 35a applies a bias voltage to the arm waveguide 25a to adjust the difference in optical path length between the arm waveguide 25a and the arm waveguide 25b. Similarly, a bias electrode 35b may be disposed on the arm waveguide 25b.

As illustrated in FIG. 1, each of the second wirings 34a and 34b includes a trunk line and multiple branches. The trunk lines of the second wirings 34a and 34b extend in the y-axis direction of the orthogonal coordinate axes S. The trunk lines of the second wirings 34a and 34b extend on the sides of the respective arm waveguides 25a and 25b. The trunk lines of the second wirings 34a and 34b and the arm waveguides 25a and 25b are spaced apart from one another in the x-axis direction of the orthogonal coordinate axes S. The branches of the second wiring 34a branch off from the trunk line of the second wiring 34a. The build-up portions 33a are connected to the respective branches of the second wiring 34a. The first wirings 32a are connected to the respective build-up portions 33a. The first electrodes 31a are connected to the respective first wirings 32a. The first electrodes 31a are in contact with the upper surface of the arm waveguide 25a. Thus, the traveling-wave electrode 30a and the arm waveguide 25a are electrically coupled together. Similarly, the traveling-wave electrode 30b and the arm waveguide 25b are electrically coupled together.

Figure 2:
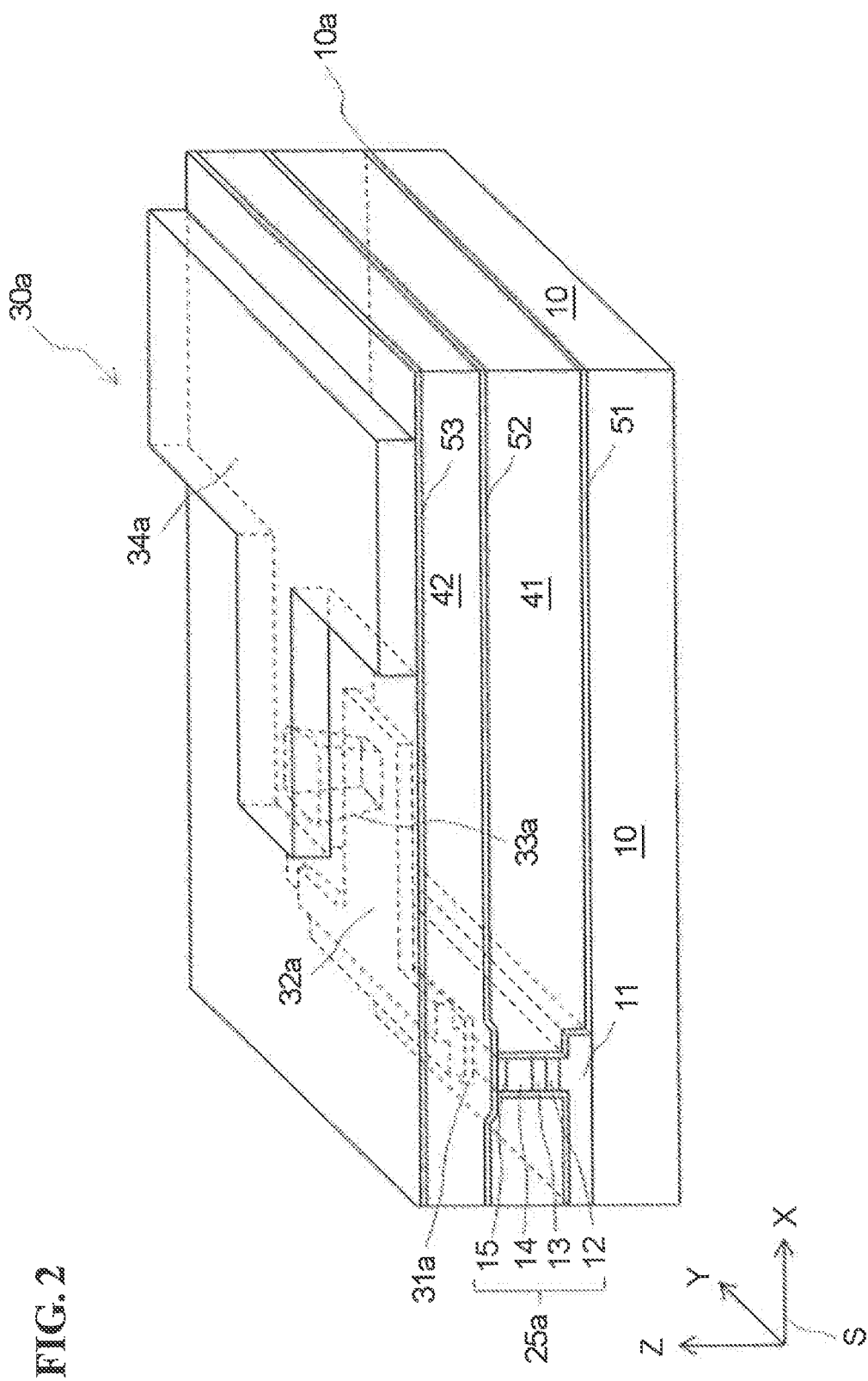
FIG. 2 is a perspective view of a connection configuration of a wiring extending from one branch of a second wiring to an upper portion of an arm waveguide.

FIG. 2 is a perspective view that illustrates the connection structure of the wirings to the arm waveguide 25a. FIG. 2 illustrates orthogonal coordinate axes S the same as those illustrated in FIG. 1. The arm waveguide 25a is disposed on the principal surface 10a of the substrate 10. The arm waveguide 25a includes a lower contact layer 11, a lower cladding layer 12, a core layer 13, an upper cladding layer 14, and an upper contact layer 15. The width of the arm waveguide 25a is, for example, 1.5 μm. The height of the arm waveguide 25a is 2.5 μm.

The first electrode 31a is disposed in contact with the upper surface of the arm waveguide 25a. The width of the first electrode 31a is 4 μm. The width of the first electrode 31a is set at a width substantially the same as the width of the arm waveguide 25a. The small width of the first electrode 31a reduces the parasitic capacitance between the first electrode 31a and the arm waveguide 25a.

The first wiring 32a is connected to the upper surface of the first electrode 31a. The first wiring 32a has a T-shape structure, and includes a first portion and a second portion. The first portion of the first wiring 32a is in contact with the upper surface of the first electrode 31a, extending in the direction in which the first electrode 31a extends (extending in the y-axis direction of the orthogonal coordinate axes S). The second portion extends in the direction perpendicular to the arm waveguide 25a (extending in the x-axis direction). The first wiring 32a is disposed in a first plane that is substantially parallel to the principal surface 10a of the substrate 10. The first plane is substantially parallel to the xy plane of the orthogonal coordinate axes S. The width of the first portion 4 μm. The length of the first portion is 150 μm. The width of the first portion is set at a width substantially the same as the width of the first electrode 31a. The width of the second portion along the y-axis direction is 20 μm and the length of the second portion in the x-axis direction is 20 μm.

The first resin layer 41 is disposed between the substrate 10 and the first wiring 32a. The second insulating film 52 is disposed on the first resin layer 41. The first wiring 32a is disposed on and in contact with the second insulating film 52. The second insulating film 52 has a thickness of 0.3 μm.

The build-up portion 33a is disposed on the second portion of the first wiring 32a. The build-up portion 33a is disposed at the far end from the arm waveguide 25a. The spacing between the build-up portion 33a and the arm waveguide 25a reduces the parasitic capacitance therebetween. The build-up portion 33a extends upward (in the z-axis direction), perpendicularly to the principal surface 10a of the substrate 10. The build-up portion 33a has a width in the y-axis direction of 5 μm, a width in the x-axis direction of 5 μm, and a height in the z-axis direction of 2 μm.

The width in the y-axis direction of the build-up portion 33a is set so as to be smaller than the width in the y-axis direction of the second portion of the first wiring 32a. The build-up portion 33a is surrounded a the second resin layer 42.

The second wiring 34a is disposed on the second resin layer 42 via the third insulating film 53. Each branch of the second wiring 34a is connected to the upper surface of the corresponding build-up portion 33a. The trunk line of the second wiring 34a is disposed so as to connect with the branches of the second wiring 34a. The second wiring 34a is disposed in a second plane substantially parallel to the principal surface 10a of the substrate 10. This second plane is substantially parallel to the xy plane of the orthogonal coordinate axes S. The second plane is spaced apart from the principal surface 10a. The width of each branch of the second wiring 34a in the y-axis direction is 15 μm and the length of each branch in the x-axis direction is 17 μm. The width of the trunk line of the second wiring 34a in the x-axis direction is 10 μm.

The third insulating film 53 and the second resin layer 42 are disposed between the second wiring 34a and the first resin layer 41. The second resin layer 42 thus supports the second wiring 34a. This structure prevents the second wiring 34a from being deformed by its weight.

The first wiring 32a and the second wiring 34a extend in two different planes with the second resin layer 42 interposed therebetween, the two planes being substantially parallel to the principal surface 10a. The build-up portion 33a disposed so as to extend perpendicularly to the principal surface 10a connects the first wiring 32a and the second wiring 34a disposed in the different planes. Since the first wiring 32a and the second wiring 34a are disposed in different planes vertically spaced apart from each other, the first wiring 32a and the second wiring 34a can be freely disposed within their own planes without being interfered with each other. This structure enhances a freedom of wiring design.

The traveling-wave electrode 30a and the arm waveguide 25a have been described thus far. The traveling-wave electrode 30b and the arm waveguide 25b also have similar structures.

Figure 3:
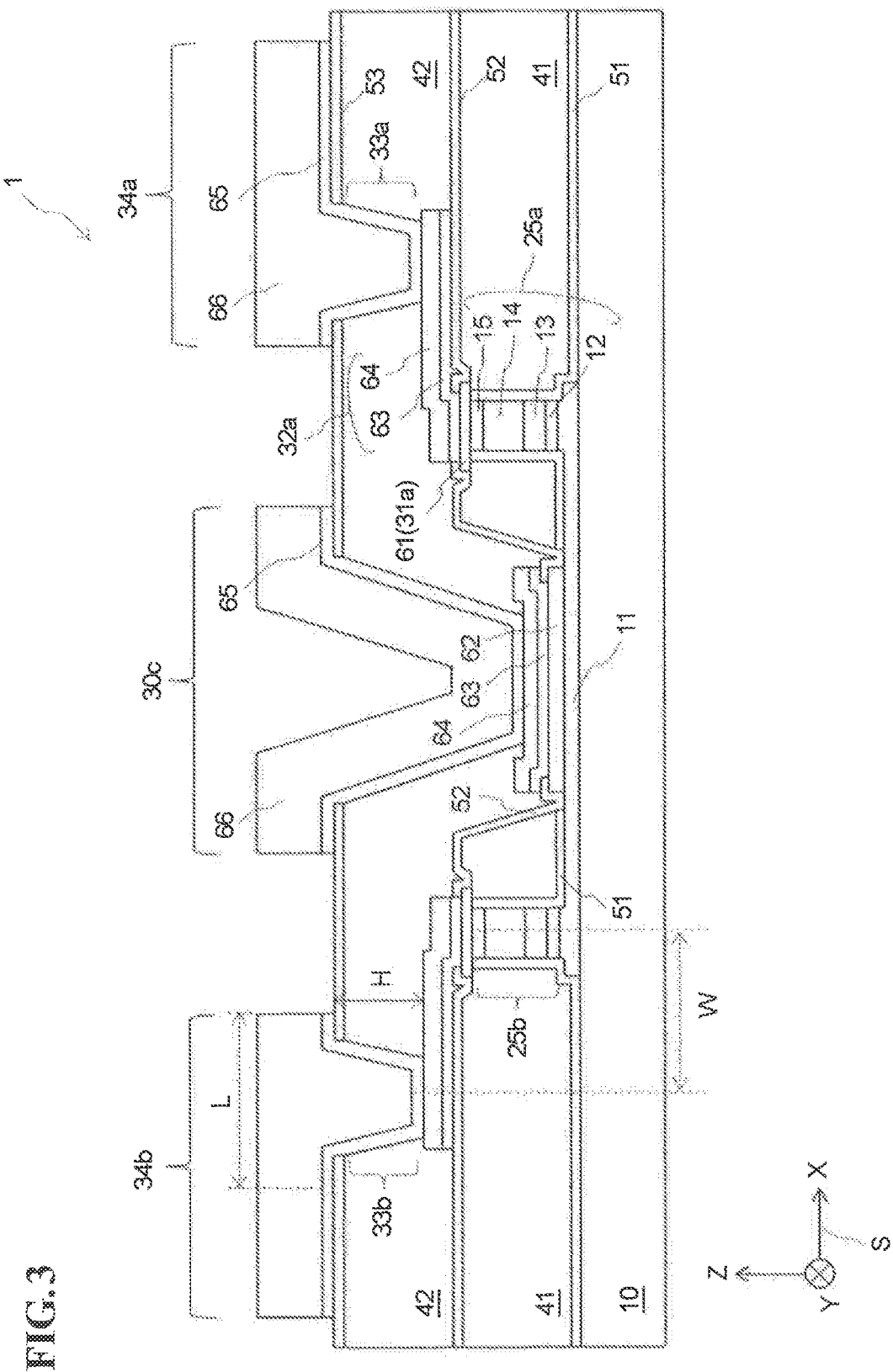
FIG. 3 is a cross-sectional view of the semiconductor optical modulator taken along the line III-III of FIG. 1.

FIG. 3 is a cross-sectional view of the semiconductor optical modulator taken along the line 111-111 of FIG. 1. FIG. 3 is a cross-sectional view taken so as to cut a branch of the second wiring 34a. FIG. 3 illustrates orthogonal coordinate axes S the same as those illustrated in FIG. 1. As illustrated in FIG. 3, the lower contact layer 11 is disposed on the substrate 10. The arm waveguides 25a and 25b are disposed on the lower contact layer 11. Each of the arm waveguides 25a and 25b includes the lower cladding layer 12, the core layer 13, the upper cladding layer 14, and the upper contact layer 15. The arm waveguides 25a and 25b are electrically coupled with each other via the lower contact layer 11. The width of the arm waveguides 25a and 25b are 1.5 µm. Preferably, the width of the arm waveguides falls within the range of 1 to 2 µm. The height of the arm waveguides 25a and 25b preferably falls within the range of 2 to 3.5 µm, and is 2.5 µm.

The substrate 10 is made of Fe-doped semi-insulating InP. The lower contact layer 11 is made of n-type InP heavily doped with Si at the doping concentration of $5 \times 10^{18}$ cm$^{-3}$. The lower cladding layer 12 is made of n-type InP lightly doped with Si at the doping concentration of $5 \times 10^{17}$ cm$^{-3}$. The thickness of the lower cladding layer 12 is 0.2 µm. The core layer 13 has a multi-quantum well (MQW) structure including a non-doped AlGaInAs layer and a non-doped AlInAs layer. The thickness of the core layer 13 is 0.3 µm. The upper cladding layer 14 is made of p-type InP doped with Zn at the doping concentration of $5 \times 10^{17}$ cm$^{-3}$. The thickness of the upper cladding layer 14 is 1.3 µm. The upper contact layer 15 is made of p-type GaInAs doped with Zn at the doping concentration of $5 \times 10^{18}$ cm$^{-3}$. The thickness of the upper contact layer 15 is 0.2 µm.

The first insulating film 51 is disposed on the surfaces of the arm waveguides 25a and 25b, the lower contact layer 11, and the substrate 10. The first resin layer 41 is disposed on the upper surface of the first insulating film 51. The first resin layer 41 embeds the arm waveguides 25a and 25b. The second insulating film 52 is disposed on the upper surface of the first resin layer 41. The second resin layer 42 is disposed on the upper surface of the second insulating film 52. The third insulating film 53 is disposed on the upper surface of the second resin layer 42. The first insulating film 51, the second insulating film 52, and the third insulating film 53 are made of an inorganic silicon compound such as SiO$_2$ or SiN. The first resin layer 41 and the second resin layer 42 are made of resin such as benzocyclobutene (BCB) or polyimide.

The first electrodes 31a and 31b are disposed in contact with the upper contact layers 15 of the respective arm waveguides 25a and 25b. The first electrodes 31a and 31b are formed of a first metal layer 61. The first metal layer 61 is composed of three metal layers of Ti, Pt, and Au layers and the total thickness of the three layers is 0.6 µm. End portions of the first electrodes 31a and 31b are covered with the second insulating film 52.

The first portions of the first wirings 32a and 32b are disposed in contact with the upper surfaces of the respective first electrodes 31a and 31b. The second portions of the first wirings 32a and 32b are disposed in contact with the upper surface of the second insulating film 52. FIG. 3 is a cross-sectional view taken so as to cut the second portions of the first wirings 32a and 32b. FIG. 3 illustrates both the first portions and the second portions. Each of the first wirings 32a and 32b has a structure in which a third metal layer 63 and a fourth metal layer 64 are stacked. The third metal layer 63 is composed of a Ti layer having a thickness of 0.05 µm and an Au layer having a thickness of 0.8 µm. The fourth metal layer 64 is composed of an Au layer having a thickness of 1 µm. The second resin layer 42 is disposed over the first wirings 32a and 32b. The second resin layer 42 has openings at portions above the second portions of the first wirings 32a and 32b. The first wiring 32a and the build-up portion 33a are in contact with each other through one opening of the second resin layer 42. Similarly, the first wiring 32b and the build-up portion 33b are in contact with each other through another opening of the second resin layer 42.

Each of the build-up portions 33a and 33b and the second wirings 34a and 34b is composed of a fifth metal layer 65 and a sixth metal layer 66. The fifth metal layer 65 is composed of a Ti layer having a thickness of 0.05 µm and an Au layer having a thickness of 0.8 µm. The sixth metal layer 66 is composed of an Au layer having a thickness of 3 µm. The build-up portions 33a and 33b and the second wirings 34a and 34b are fabricated in the same process and composed of the same materials. In this embodiment, portions of the fifth and sixth metal layers surrounded with the second resin layer 42 serve as build-up portions. The portions of the fifth and sixth metal layers disposed on the upper surface of the second resin layer 42 serve as second wirings.

In FIG. 3, the distance between the center of the bottom surface of the build-up portion 33b and the center of the arm waveguide 25b is denoted by the reference symbol W. The distance W is 4.5 µm. The height of the build-up portion 33b is denoted by the reference symbol H. The height H is 2 µm. FIG. 3 includes the cross section of the second wiring 34b including both the branch and the trunk line. In the cross section of the second wiring 34b, the length of the branch is denoted by the reference symbol L. The length L is 17 µm. Increasing the distance W, the height H, and the length L allows the second wiring 34b, the build-up portion 33b, and the first wiring 32b to be spaced apart from the arm waveguide 25b. The increase of the spacing between the wirings and the arm waveguide reduces the parasitic capacitance.

As the second wiring 34b is supported by the second resin layer 42 and the third insulating film 53, the increase of the length L does not cause sagging of the second wiring 34b. As the build-up portion 33b is surrounded with the second resin layer 42, the increase of the height H does not cause deformation of the build-up portion 33b. As the second portion of the first wiring 32b is supported by the first resin layer 41 and the second insulating film 52, the increase of the distance W does not cause deformation of the first wiring 32b.

The ground electrode 30c is disposed between the arm waveguides 25a and 25b. The ground electrode 30c is in contact with the lower contact layer 11. The ground electrode 30c includes a second metal layer 62, the third metal layer 63, the fourth metal layer 64, the fifth metal layer 65, and the sixth metal layer 66. The second metal layer 62 is composed of four metal layers of AuGeNi alloy, Au, Ti, and Au layers. The second metal layer 62 has a width of 16 µm and a thickness of 0.3 µm. The second metal layer 62 is in contact with the lower contact layer 11. End portions of the second metal layer 62 are covered with the second insulating film 52. The third metal layer 63 is in contact with the second metal layer 62. The fourth metal layer 64 is stacked on the third metal layer 63. The second resin layer 42 is disposed over the fourth metal layer 64. The second resin layer 42 has an opening at a portion above a center portion of the fourth metal layer 64. The fourth metal layer 64 and the fifth metal layer 65 are in contact with each other through the opening formed in the second resin layer 42. The fifth metal layer 65 is disposed on the bottom surface of the opening of the second resin layer 42. The fifth metal layer 95 covers the inclined surfaces of the opening of the second resin layer 42 and portions of the upper surface of the second resin layer 42. The sixth metal layer 66 is stacked on the fifth metal layer 65. The ground electrode 30c has a structure of the multiple stacked metal layers. In this embodiment, ten metal layers are stacked between the second metal layer 62 and the sixth metal layer 66. This structure can reduce the resistance of the ground electrode 30c.

The ground electrode 30c has a large width covering the lower contact layer 11, the inclined surface of the second resin layer 42, and the edge of the upper surface of the third insulating film 53. The electric potential of the ground electrode used as a reference for modulation is stabilized. In addition, by using the thick second resin layer 42, the ground electrode 30c can be spaced a distance apart from the arm waveguides 25a and 25b. The parasitic capacitance between the ground electrode 30c and the arm waveguides 25a and 25b is minimized.

Figure 4:
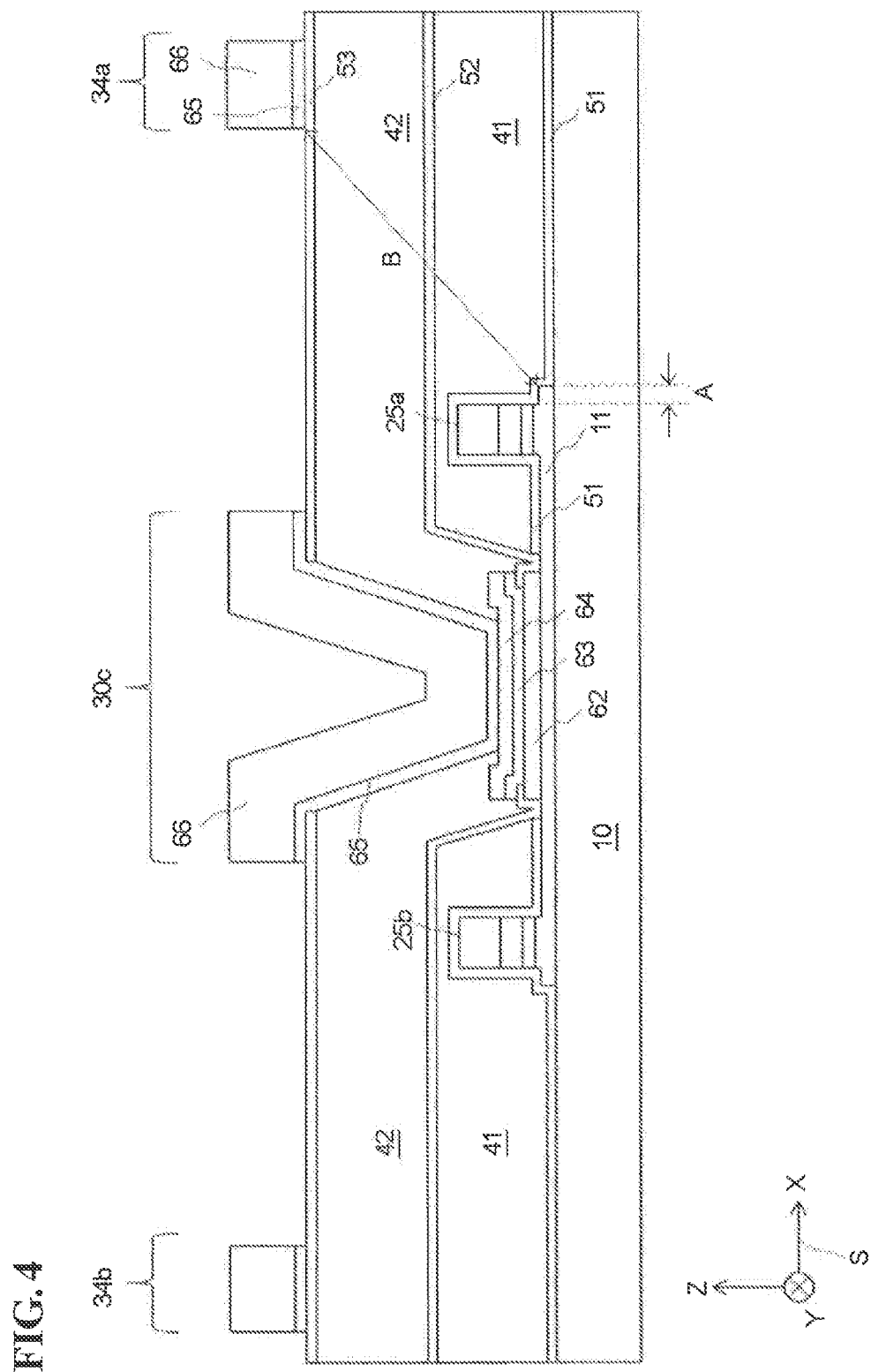
FIG. 4 is a cross-sectional view of the semiconductor optical modulator taken along the line IV-IV of FIG. 1.

FIG. 4 is a cross-sectional view of the semiconductor optical modulator taken along the line IV-IV of FIG. 1. FIG. 4 is a cross section taken at the middle between adjacent branches of the second wiring 34a. FIG. 4 illustrates orthogonal coordinate axes S the same as those in FIG. 1. The ground electrode 30c is disposed between the arm waveguide 25a and the arm waveguide 25b. The trunk lines of the second wirings 34a and 34b are disposed at positions outward from the respective arm waveguides 25a and 25b. In FIG. 4, the distance between the trunk line of the second wiring 34a and the lower contact layer 11 is denoted by the reference symbol B. The width by which the lower contact layer 11 protrudes from the arm waveguide 25a is denoted by the reference symbol A. A larger distance B is desirable to reduce the parasitic capacitance. To increase the distance B, it is desirable that the thickness of the second resin layer 42 be 2 μm or larger. In addition, to increase the distance B, it is desirable that the width A be 5 μm or smaller. In this embodiment, the width A is 1 μm.

Figure 5:
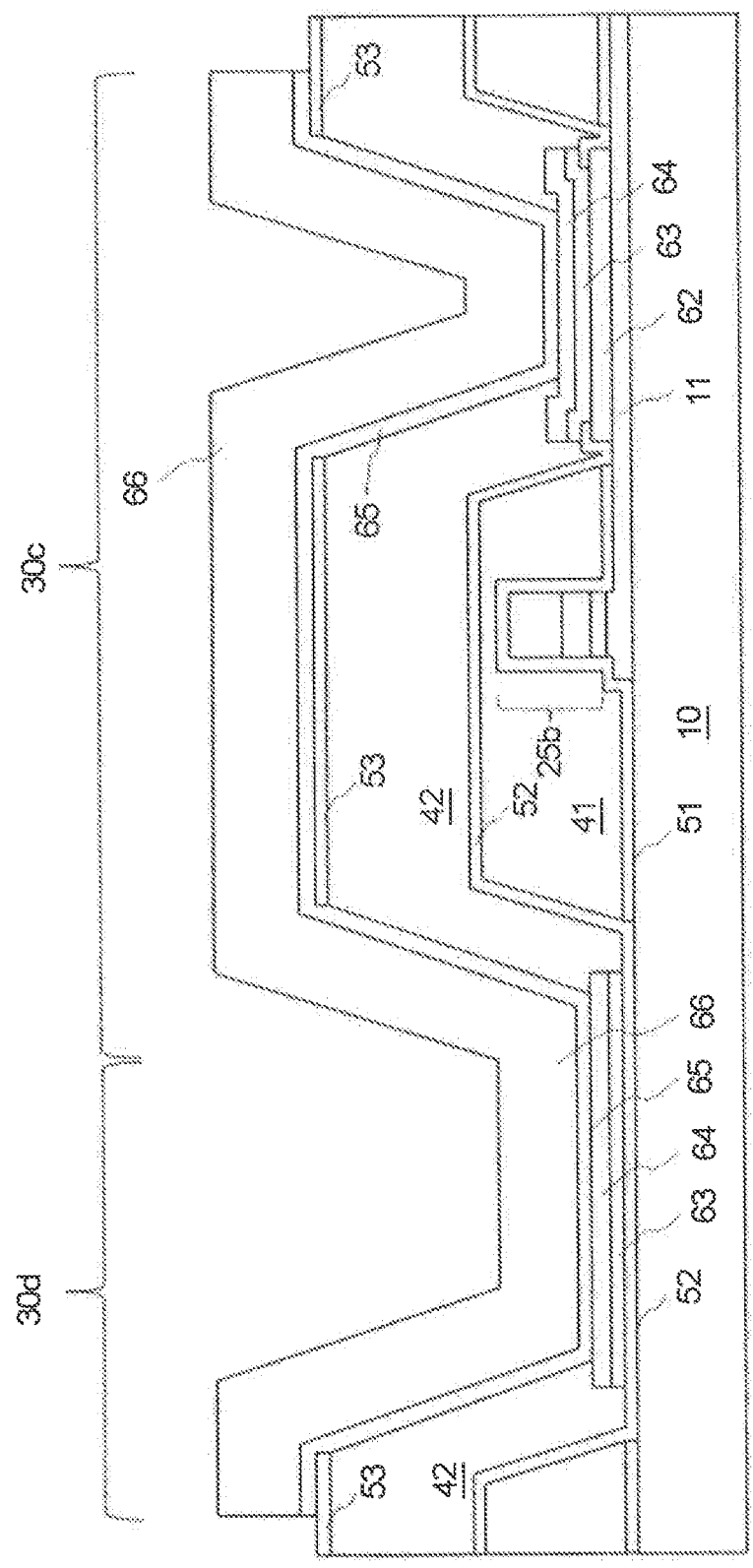
FIG. 5 is a cross-sectional view of the semiconductor optical modulator taken along the line V-V of FIG. 1.

FIG. 5 is a cross-sectional view of the semiconductor optical modulator taken along the line V-V of FIG. 1. FIG. 5 is a cross section of the ground electrode 30c extending from the lower contact layer 11 to the electrode pad 30d. The ground electrode 30c extends from the surface of the lower contact layer 11 to the upper surface of the third insulating layer 53 via the inclined surfaces of the second resin layer 42. The ground electrode 30c has a portion crossing above the arm waveguide 25b. In an area where the ground electrode 30c crosses over the arm waveguide 25b, the first insulating film 51, the first resin layer 41, the second insulating film 52, the second resin layer 42, and the third insulating film 53 are disposed between the ground electrode 30c and the arm waveguide 25b. The existence of the resin layers and the insulating films allows the ground electrode 30c and the arm waveguide 25b to be spaced a large distance apart from each other. The ground electrode 30c is supported by these resin layers and insulating films. The ground electrode 30c is prevented from being sagged by its weight. The parasitic capacitance between the ground electrode 30c and the arm waveguide 25b is thus kept low.

The electrode pad 30d is disposed on the second insulating film 52. Under the electrode pad 30d, the second insulating film is in contact with the substrate 10. The first resin layer 41 and the second resin layer 42 are removed at a portion between the electrode pad 30d and the substrate 10. Thus, the electrode pad 30d can keep finely adhering to the substrate 10. The electrode pad 30d includes the third metal layer 63, the fourth metal layer 64, the fifth metal layer 65, and the sixth metal layer 66. An end portion of the electrode pad 30d is covered with the second resin layer 42. Since the electrode pad 30d has its end portion held by the second resin layer 42 having a large volume, the electrode pad 30d can keep finely adhering to the substrate 10 with the second insulating film 52.

Referring now to FIGS. 6 to 11B, a method for manufacturing a semiconductor optical modulator is described. FIGS. 6 to 11B illustrate main processes for manufacturing a semiconductor optical modulator according to an embodiment. FIGS. 6 to 11B include orthogonal coordinate axes S the same as those in FIG. 1.

Figure 6:
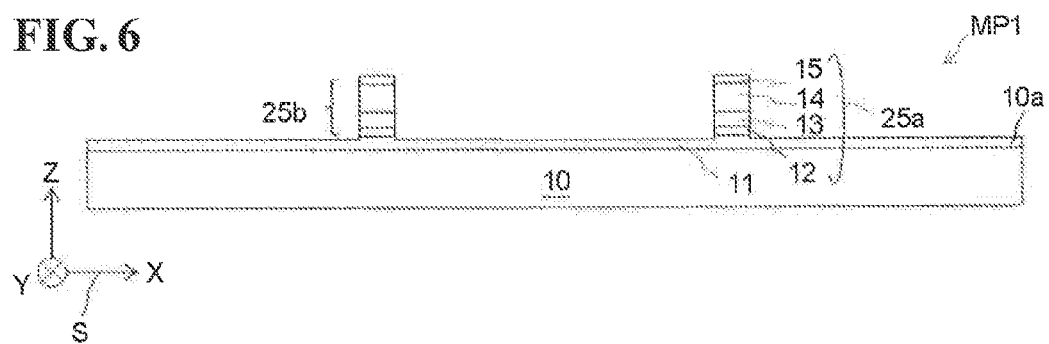
FIG. 6 is a diagram for illustrating main steps of a method for manufacturing a semiconductor optical modulator according to the first embodiment.

Referring to FIG. 6, an intermediate product MP1 including the arm waveguides 25a and 25b on the substrate 10 is produced. A stacked semiconductor layer is formed on the principal surface 10a of the semiconductor substrate 10 by an organometallic vapor phase epitaxy (OMVPE) method. The stacked semiconductor layer include the lower contact layer 11, the lower cladding layer 12, the core layer 13, the upper cladding layer 14, and the upper contact layer 15. The stacked semiconductor layer is dry-etched with a gas such as chlorine using a mask made of silicon nitride (SiN) so as to form the arm waveguides. The depth of the dry-etching is preferably 2 μm to 3.5 μm. In this embodiment, the depth is 2.5 μm. Etching is stopped in the middle of the lower contact layer 11. The width of the arm waveguides are 1.5 μm.

Figure 7A:
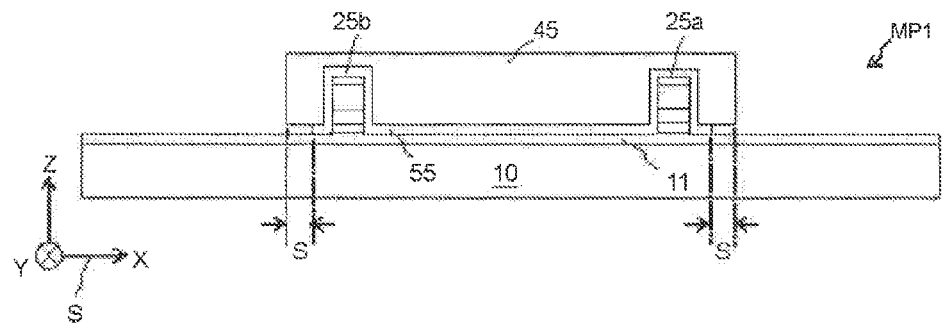
FIGS. 7A and 7B are diagrams for illustrating main steps of the method for manufacturing a semiconductor optical modulator according to the first embodiment.

Referring to FIG. 7A, a resist mask 45 and an insulating mask 55 are formed on the intermediate product MP1. The masks 45 and 55 are formed as follows; The insulating film is deposited on the intermediate product MP1. The resist mask 45 is formed on the insulating film by photolithography. The insulating mask 55 is formed by wet-etching the insulating film using the resist mask 45. The etchant of the wet-etching is buffered hydrogen fluoride (BHF). The masks 45 and 55 cover the arm waveguides 25a and 25b. The masks 45 and 55 cover a portion of the lower contact layer 11. The masks 45 and 55 have openings in regions on the outer sides of the arm waveguides 25a and 25b. As the insulating mask 55 is formed by wet-etching method, side etching portions are formed in the mask 55 under the edge of the mask 45. In FIG. 7A, the reference symbol S denotes the width of the side etching portion. Side etching causes the edge of the mask 55 closer to the arm waveguides 25a and 25b. The amount S is controlled by changing the duration of wet etching.

Figure 7B:
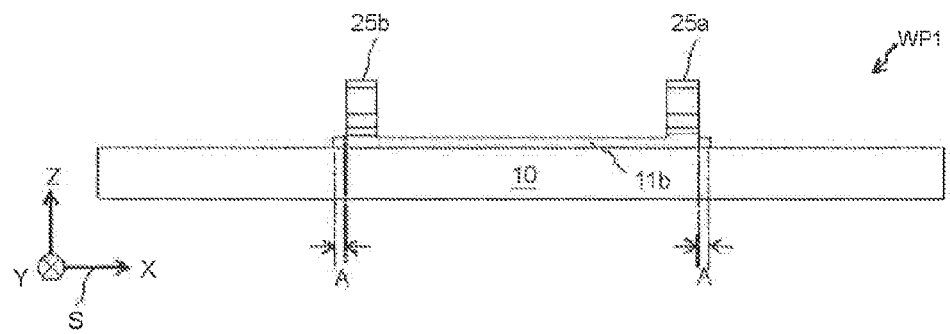

FIG. 7B illustrates the lower contact layer 11 after being dry-etched using the mask 55. An isolation mesa 11b is obtained. The substrate 10 is exposed on both sides of the isolation mesa 11b. The isolation mesa 11b has a protruding portion protruding from the arm waveguides 25a and 25b. The reference symbol in FIG. 7B denotes the width of the protruding portion. By adjusting the width of the side etching portion S, the width of the protruding portion A can be changed. The substrate 10 having the arm waveguides 25a and 25b and the isolation mesa 11b disposed thereon is referred to as a substrate product WP1.

Figure 8A:
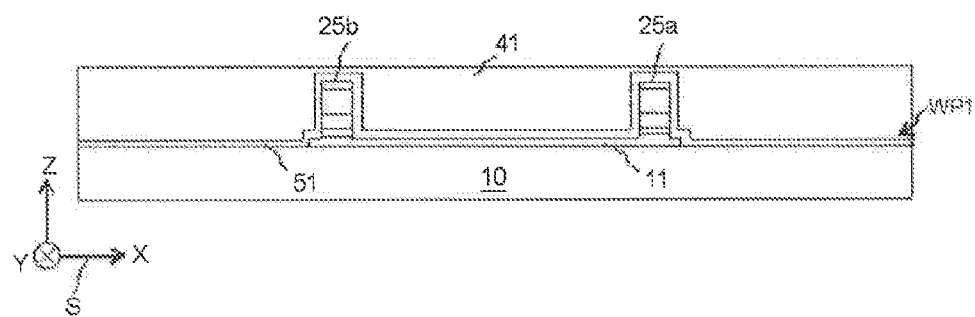
FIGS. 8A and 8B are diagrams for illustrating main steps of the method for manufacturing a semiconductor optical modulator according to the first embodiment.

Referring to FIG. 8A, the first insulating film 51 and the first resin layer 41 are formed so as to cover the surface of the substrate product WP1. The first insulating film 51 is made of an inorganic silicon compound such as silicon dioxide ($SiO_2$). The first insulating film 51 is deposited by a chemical vapor deposition (CVD) method. The first resin layer 41 is made of resin such as BCB or polyimide and is formed by a spin coating method. The thickness of the first resin layer 41 above the arm waveguides 25a and 25b is 1 μm. It is preferable that the thickness of portions of the first resin layer 41 above the arm waveguides 25a and 25b be 1.5 μm or smaller. This is preferable because this thickness can render the depth of openings stable when the openings are formed in the first resin layer 41 at portions above the arm waveguides 25a and 25b in a subsequent step. The thickness of the resin layer 41 is adjusted by adjusting the rotation rate in spin coating.

Figure 8B:
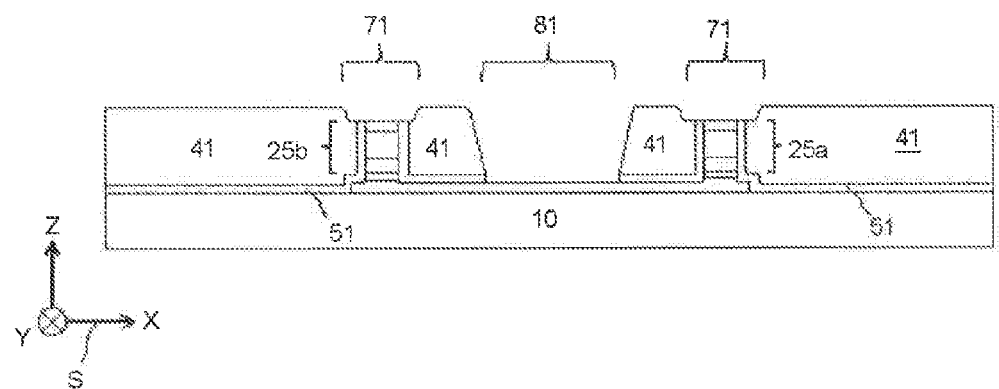

Referring to FIG. 8B, first openings 71 and a second opening 81 are formed in the first resin layer 41 and the first insulating film 51. The openings 71 and 81 are formed by dry-etching method. The first resin layer 41 and the first insulating film 51 are dry-etched using the gas containing oxygen and carbon fluoride. The top surfaces of the arm waveguides 25a and 25b are exposed in the first openings 71. The lower contact layer 11 of the isolation mesa is exposed in the second opening 81. Since the first resin layer 41 is thin on the arm waveguides 25a and 25b, the surface of the first resin layer 41 is positioned substantially level with the upper surfaces of the arm waveguides 25a and 25b. Thus, the depth of etching can be precisely controlled. Thereafter, portions of the first resin layer 41 and the first insulating film 51 above the lower contact layer 11 are dry-etched to form a first lower opening 81. It is preferable that the width of the first openings 71 be 4 µm or larger. In this embodiment, the width is 20 µm. It is preferable that the width of the first lower opening 81 be 5 µm or larger. In this embodiment, the width is 24 µm.

Figure 9A:
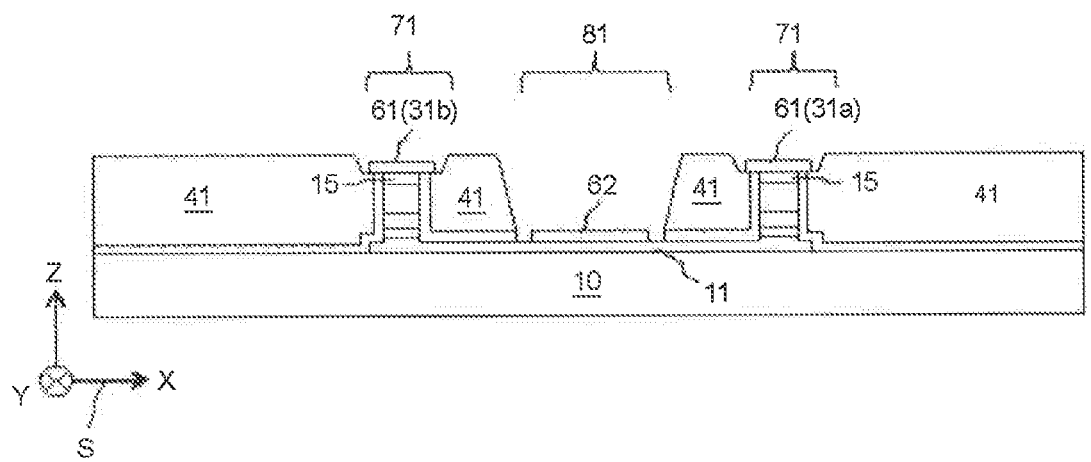
FIGS. 9A and 9B are diagrams for illustrating main steps of the method for manufacturing a semiconductor optical modulator according to the first embodiment.

Referring to FIG. 9A, the first metal layers 61 are formed in the first openings 71, and the second metal layer 62 is formed in the second opening 81. The first metal layer 61 is composed of three metal layers of Ti, Pt, and Au layers. The second metal layer 62 is composed of stacked metal layers of AuGeNi alloy, Au, Ti, and Au layers. The first metal layer 61 and the second metal layer 62 are formed by evaporation and lift-off. The first metal layer 61 is in contact with the upper contact layers 15 of the arm waveguides 25a and 25b. The first metal layer 61 serves as the first electrodes 31a and 31b. The width of the first electrodes 31a and 31b is 4 µm. The width of the first electrodes 31a and 31b is set so as to be smaller than the width of the first openings 71. The width of the second metal layer 62 is 16 µm. The second metal layer 62 is in contact with the lower contact layer 11.

Figure 9B:
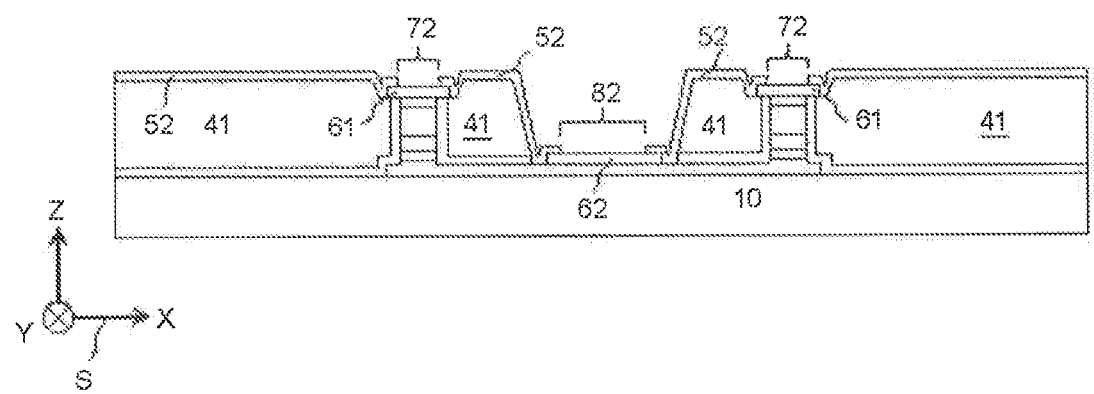

Referring to FIG. 9B, the second insulating film 52 is formed so as to cover the first resin layer 41, the first metal layer 61, and the second metal layer 62. The second insulating film 52 is made of an inorganic silicon compound such as silicon dioxide (SiO$_2$) or silicon nitride (SiN). The second insulating film 52 is deposited by a sputtering method or a CVD method.

Subsequently, the second insulating film 52 is dry-etched to form third openings 72 and a forth opening 82. The first metal layers 61 are exposed in the third openings 72. The second metal layer 62 is exposed in the fourth opening 82. The width of the third openings 72 is 2 µm. The width of the fourth opening 82 is 14 µm. The widths of the third and fourth openings are set smaller than the widths of the first and second metal layers. The first and second metal layers have a structure in which their end portions remain covered with the second insulating film 52 by 1 µm. The structure in which the end portions of a metal layer are covered with the insulating film enhances the adhesion between the metal layer and their base material.

Figure 10A:
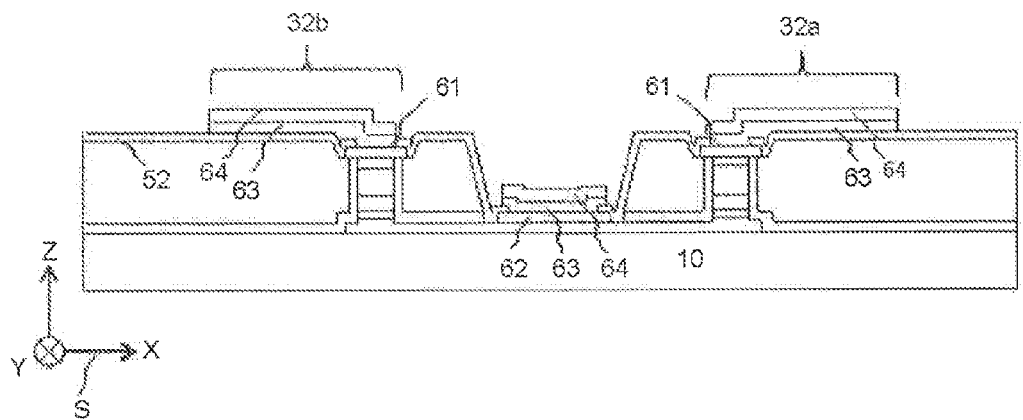
FIGS. 10A and 10B are diagrams for illustrating main steps of the method for manufacturing a semiconductor optical modulator according to the first embodiment.

Referring to FIG. 10A, the third metal layers 63 are formed on the second insulating film 52, on the first metal layer 61, and on the second metal layer 62. The third metal layer 63 is formed by the sputtering method. The third metal layer 63 is composed of two metal layers of Ti and Au layers and has a thickness of 0.85 µm. The fourth metal layers 64 made of Au are formed on the third metal layers 63. The thickness of the fourth metal layer 64 is 1 µm. The fourth meal 64 is formed by plating method using a resist mask. The resist mask has T-shape openings corresponding to the shape of the first wirings 32a and 32b, in addition to a stripe shape opening corresponding to the shape of the ground electrode 30c. The fourth metal layers 64 are plated in the openings of the resist mask. Subsequently, portions of the third metal layer 63 exposed through the fourth metal layer 64 are removed by ion milling with argon ions. The third metal layers 63 under the fourth metal layers 64 are left unremoved. The third and fourth metal layers on the first metal layers 61 and on the second insulating film 52 consist of the first wirings 32a and 32b.

Figure 10B:
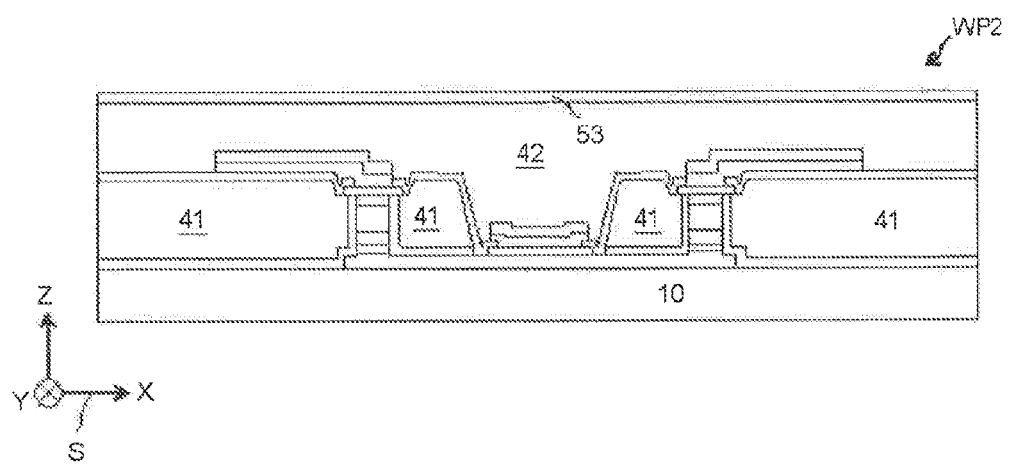

Referring to FIG. 10B, the second resin layer 42 is formed so as to cover the second insulating film 52, the first wirings 32a and 32b, and the fourth metal layer 64. The second resin layer 42 is made of BCB resin. The second resin layer 42 is spin-coated and is then thermally cured. At this time, the rotation rate in spin coating is adjusted so that portions of the second resin layer 42 above the second insulating film 52 have a thickness of 2 µm or larger. Subsequently, the third insulating film 53 is formed on the surface of the second resin layer 42 by the sputtering method or the CVD method. The third insulating film 53 is made of an inorganic silicon compound such as SiO$_2$ or silicon nitride (SiN). In this manner, a substrate product WP2 having a substantially flat upper surface is obtained as illustrated in FIG. 10B.

Figure 11A:
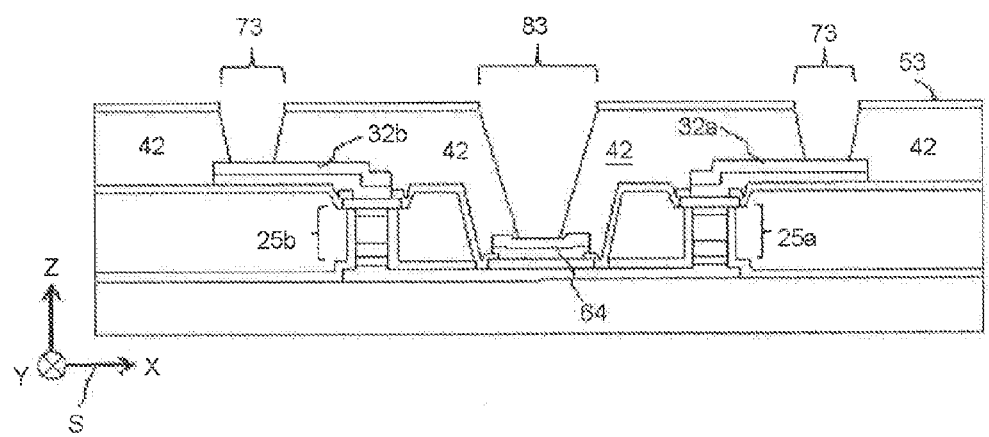
FIGS. 11A and 11B are diagrams for illustrating main steps of the method for manufacturing a semiconductor optical modulator according to the first embodiment.

Referring to FIG. 11A, portions of the third insulating film 53 and the second resin layer 42 are dry-etched to form fifth openings 73 and a sixth opening 83. The fifth openings 73 are formed at portions on the end portions of the first wirings 32a and 32b opposite to the respective arm waveguides 25a and 25b. The width of the fifth openings 73 on the first wirings 32a and 32b are 5 µm. The width of the fifth openings 73 is set so as to be smaller than the width of the first wirings 32a and 32b. Thus, the dry etching of the second resin layer 42 is stopped at the upper surfaces of the first wirings 32a and 32b. Thus, the openings can have a stable depth even when the second resin layer 42 has a larger thickness. The second resin layer 42 having a large thickness helps reducing the parasitic capacitance. The sixth opening 83 is formed above the fourth metal layer 64. The width of the sixth opening 83 is 12 µm.

Figure 11B:
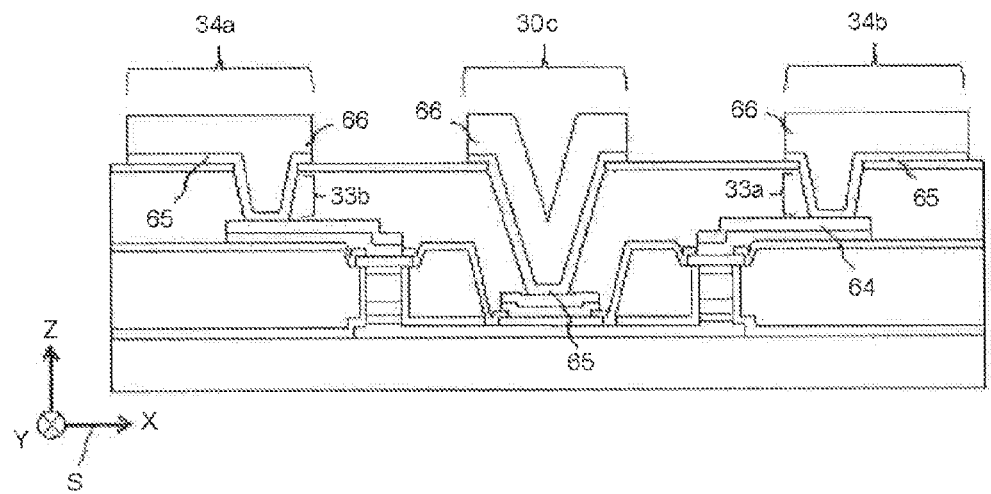

Referring to FIG. 11B, the fifth metal layer 65 and the sixth metal layer 66 are formed. The fifth metal layer 65 is formed by the sputtering method. By adopting the sputtering method, the fifth metal layer 65 is finely deposited on the steep inner wall surfaces of the fifth openings 73. The fifth metal layer 65 is composed of two metal layers of Ti and Au layers. The thickness of Ti in the fifth metal layer 65 is 0.05 µm, and the thickness of Au in the fifth metal layer 65 is 0.8 µm. The sixth metal layer 66 is formed by plating method. The sixth metal layer 66 is patterned using a resist mask. The fifth metal layer 65 is patterned by ion milling using the sixth metal layer 66 as a mask.

As illustrated in FIG. 11B, the fifth metal layer 65 and the sixth metal layer 66 in the fifth openings 73 constitute the build-up portions 33a and 33b. The fifth metal layer 65 and the sixth metal layer 66 on the third insulating film 53 constitute the second wirings 34a and 34b. The second to sixth metal layers in the sixth opening 83 constitute the ground electrode 30c. Thus, the build-up portions 33a and 33b surrounded with the second resin layer 42 and the second wirings 34a and 34b disposed on the upper surface of the second resin layer 42 are concurrently obtained. As described above, the build-up portions 33a and 33b and the second wirings 34a and 34b are formed in the same manufacturing step.

In this embodiment, the first resin layer 41 and the second resin layer 42 are formed in different manufacturing steps. Thus, the thicknesses of the two resin layers are independently determined. It is preferable that the first resin layer 41 have a small thickness so as to prevent excessive etching in the process of forming the first upper openings 71. It is preferable that the second resin layer 42 have a large thickness so that the second wirings 34a and 34b are spaced well apart from the arm waveguides 25a and 25b. This structure enables production reproducibility and reduction of parasitic capacitance.

The method according to the embodiment described above can attain the wiring structure in which a first wiring and a second wiring are disposed in two different planes substantially parallel to the principal surface of a substrate, the first wiring and the second wiring are supported by resin layers, and the first wiring and the second wiring are connected together by a build-up portion extending vertically.

Second Embodiment

Figure 12:
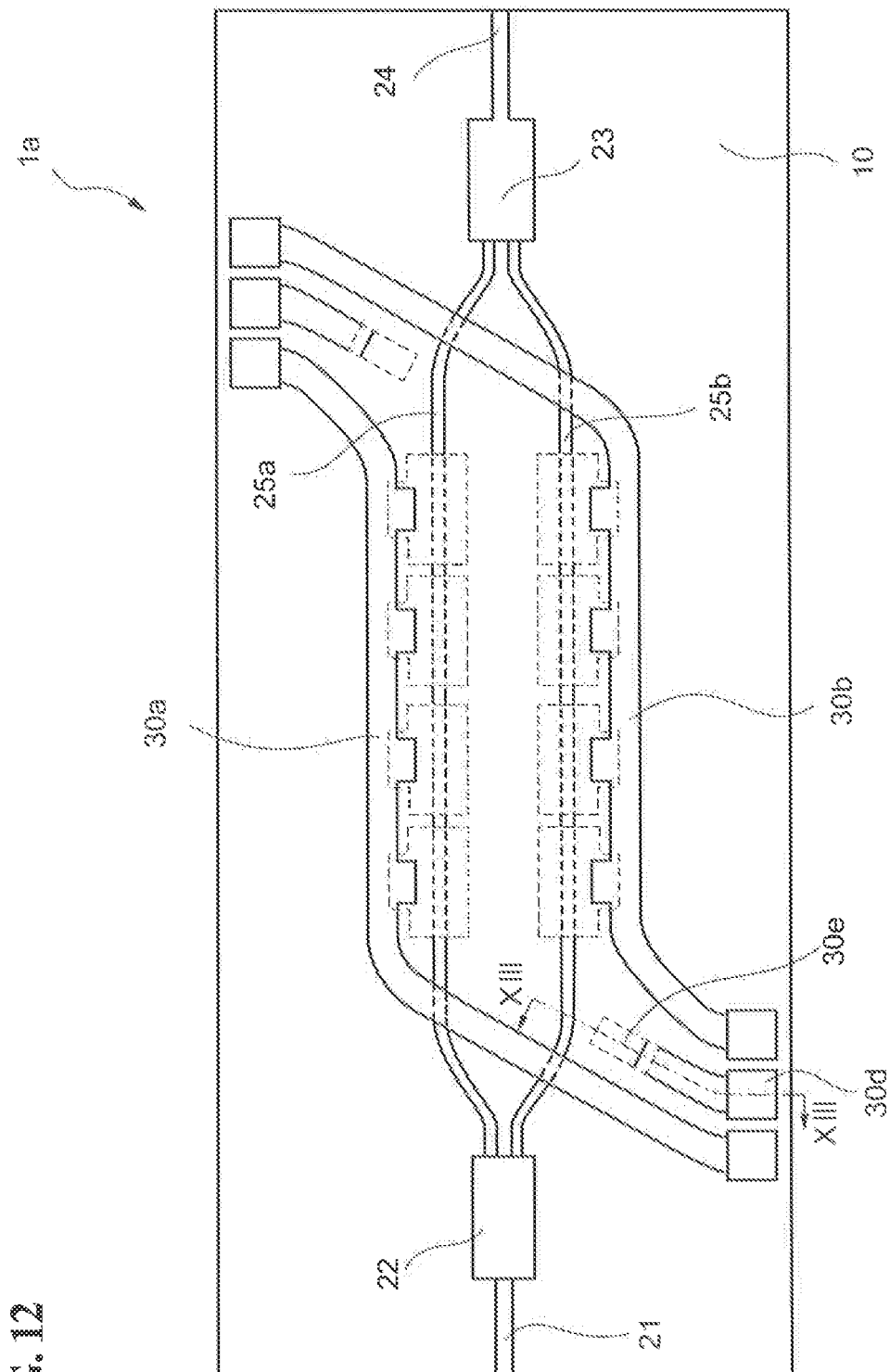
FIG. 12 is a plan view of a semiconductor optical modulator according to a second embodiment.

FIG. 12 is a top view of a Mach-Zehnder modulator 1a according to another embodiment of the invention. Similarly to the Mach-Zehnder modulator 1, the Mach-Zehnder modulator 1a includes the input waveguide 21, the optical couplers 22 and 23, the output waveguide 24, the arm waveguides 25a and 25b, the traveling-wave electrodes 30a and 30b, and the electrode pads 30d. The Mach-Zehnder modulator 1a includes a ground electrode 30e instead of the ground electrode 30c of the Mach-Zehnder modulator 1. The ground electrode 30e extends between electrode pads 30d from the outer side of the arm waveguides 25a and 25b.

FIG. 13 is a cross-sectional view of the Mach-Zehnder modulator 1a taken along the line XIII-XIII of FIG. 12. The ground electrode 30e includes a second electrode 91, a third wiring 92, a ground build-up portion 93, and a fourth wiring 94. The second electrode 91 is in contact with the upper surface of the lower contact layer 11 at a portion on the outer side of the arm waveguide 25b. The isolation mesa 11b is an extended portion of the lower contact layer 11 of the arm waveguide 25b. The arm waveguide 25b is disposed on the isolation mesa 11b. The isolation mesa 11b is disposed on the substrate 10. The third wiring 92 is in contact with the upper surface of the second electrode 91. The third wiring 92 extends over the inclined surface of the opening in the first resin layer 41 and over the first resin layer 41. The ground build-up portion 93 is in contact with the third wiring 92 and extends over the wall surface of the opening in the second resin layer 42. The ground build-up portion extends in the direction perpendicular to the surface of the substrate 10.

The fourth wiring 94 is connected to the ground build-up portion 93 and extends over the upper surface of the second resin layer 42. The fourth wiring 94 connects to the electrode pad 30d. The second insulating film 52 is disposed over the first resin layer 41 and over the wall surface of the opening of the first resin layer 41. The second insulating film 52 enhances the adhesion between the ground electrode 30e and the resin layers. The ground electrode 30e extends over the first resin layer 41 and the wall surface of the second resin layer 42 up to portions of the upper surface of the second resin layer 42. Since the electrode extends between the wall surfaces of two openings, the wiring can be raised from the lower contact layer 11 to the upper surface of the third insulating film 53 within a short distance in a plane. The ground electrode 30e can also be three-dimensionally wired, instead of being wired in a plane. The ground build-up portion 93 has a two-layer structure including the fifth metal layer 65 and the sixth metal layer 66. The fifth and sixth metal layers 65 and 66 are the same metals described in the first embodiment.

Referring now to FIGS. 14A to 17B, a method for manufacturing the Mach-Zehnder modulator 1a is described. FIGS. 14A to 17B are cross-sectional views taken at the same position as the cross-sectional view of FIG. 13.

FIGS. 14A to 17B illustrate processes of forming the ground electrode 30e in the steps for manufacturing the Mach-Zehnder modulator 1a.

Figure 14A:
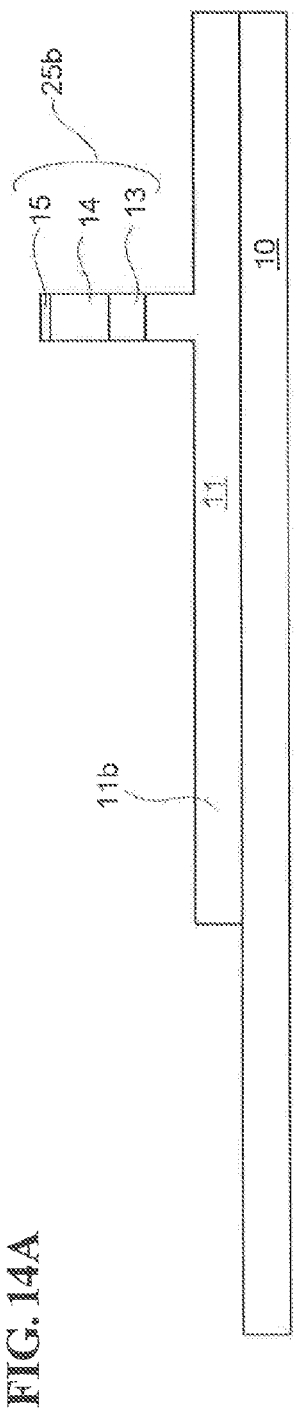
FIGS. 14A and 14B are diagrams for illustrating main steps of a method for manufacturing a semiconductor optical modulator according to the second embodiment.
Figure 14B:
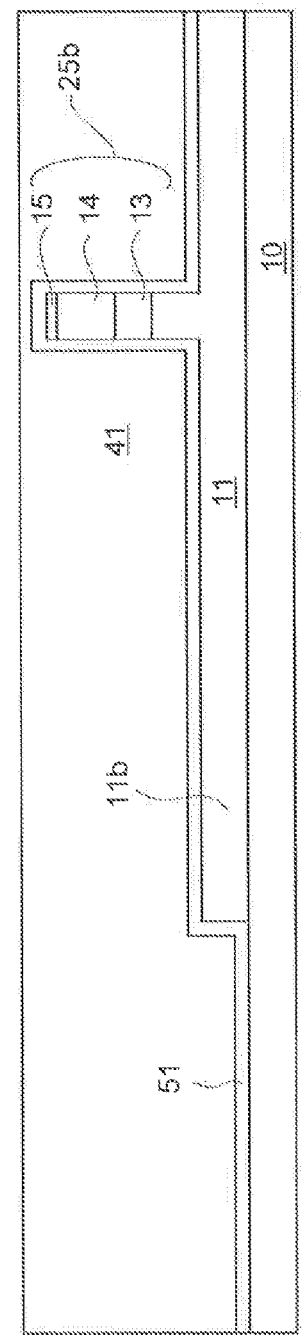

As illustrated in FIG. 14A, the arm waveguide 25b and the isolation mesa 11b are formed by dry etching the stacked semiconductor layer and the lower contact layer on the substrate 10. The portion of the isolation mesa 11b on the outer side of the arm waveguide 25b where the ground electrode 30e is to be formed is left so as to be wider. As illustrated in FIG. 14B, the first insulating film 51 and the first resin layer 41 are formed on the substrate 10. The first resin layer 41 embeds the arm waveguide 25b and the isolation mesa 11b. The upper surface of the first resin layer 41 is substantially flat.

As illustrated in FIG. 15A, a first lower opening 101 is formed in the first resin layer 41. The first lower opening 101 is formed on the outer side of the arm waveguide 25b. The lower contact layer 11 is exposed in the opening 101. Subsequently, as illustrated in FIG. 15B, the second metal layer 62 is formed in the first lower opening 101. The second metal layer 62 is in contact with the lower contact layer 11. The second metal layer 62 serves as a second electrode. Subsequently, as illustrated in FIG. 15C, the second insulating film 52 is formed. The second insulating film 52 covers the surface of the first resin layer 41 and the inclined surface of the first lower opening 101. The second insulating film 52 has an opening above the second metal layer 62.

As illustrated in FIG. 16A, the third wiring 92 composed of the third metal layer 63 and the fourth metal layer 64 are formed. The third metal layer 63 is formed by the sputtering method and patterned by ion milling. The fourth metal layer 64 is formed on the third metal layer 63 by a plating method. The third wiring 92 is formed on the second electrode, and on the inclined surface of the first lower opening 101. The third wiring 92 is also formed on the upper surface of the second insulating film 52. On the upper surface of the second insulating film 52, the third wiring 92 extend in a direction parallel to the principal surface 10a of the substrate 10. As illustrated in FIG. 16B, the first lower opening 101 is and the third wiring 92 are embedded with the second resin layer 42. The upper surface of the second resin layer 42 is substantially flat. The third insulating film 53 is formed on the second resin layer 42.

As illustrated in FIG. 17A, a second lower opening 102 is formed in the second resin layer 42. The second lower opening 102 is formed by dry etching the third insulating film 53 and the second resin layer 42. The width of the second lower opening 102 is smaller than the width of the third wiring 92. Dry etching is performed until the surface of the third wiring 92 is exposed at the bottom of the opening 102. In the Mach-Zehnder modulator 1a, the thickness of the second resin layer 42 on the first wirings (as illustrated in FIG. 10B) is substantially the same as that on the third wiring 92 (as illustrated in FIG. 16B). The sixth openings 73 on the first wirings (as illustrated in FIG. 11A) and the second lower opening 102 are formed in a single etching process. Etching is stopped at the point at which the metal layer is exposed. As illustrated in FIG. 17A, the third lower opening of the Mach-Zehnder modulator 1a is formed at a position different from the positions of the first lower opening and the second metal layer 62. The third lower opening is formed space apart from the arm waveguide 25b than the first lower opening is.

As illustrated in FIG. 17B, the ground build-up portion 93 and the fourth wiring 94 are formed. The fourth wiring 94 is composed of the fifth metal layer 65 and the sixth metal layer 66. The fifth and the sixth metal layers 65 and 66 are formed in the second lower opening 102 and on the surface of the third insulating film 53 by the sputtering method, the plating method, and the ion milling method. The fifth and sixth metal layers 65 and 66 formed in the second lower opening serve as a ground build-up portion 92 that extends almost perpendicularly to the principal surface 10a of the substrate.

The above-described method according to the embodiment allows wirings to be disposed on the first resin layer and the second resin layer, which are substantially parallel to the principal surface of the substrate. The ground wiring is connected between the lower contact layer and the upper surface of the second resin layer via the ground build-up portion extending vertically. The present invention is not limited to the embodiments described above. The structures according to the above-described embodiments may be replaced with structures substantially the same as the structures according to the above-described embodiments, structures having the same operations and effects as the structures according to the above-described embodiments, and structures that can attain the same purposes as the structures according to the above-described embodiments.

What is claimed is:

1. A semiconductor optical modulator, comprising:
    a substrate having a principal surface;
    a waveguide disposed on the principal surface of the substrate, the waveguide extending in a first direction;
    a first electrode disposed on the waveguide, the first electrode being in contact with an upper surface of the waveguide;
    a first wiring connected to the first electrode, the first wiring extending in a second direction intersecting the first direction;
    a build-up portion connected to the first wiring;
    a second wiring connected to the build-up portion, the second wiring extending in a plane parallel to the principal surface of the substrate;
    a first resin layer disposed between the first wiring and the substrate, the first resin layer embedding the waveguide; and
    a second resin layer disposed between the first resin layer and the second wiring, the Second resin layer embedding the first electrode and the build-up portion, wherein
    the build-up portion extends along a third direction, the third direction intersecting the principal surface of the substrate,
    the second wiring is disposed on the resin layer, and
    the resin layers embed the first wiring.

2. The semiconductor optical modulator according to claim 1,
    wherein the build-up portion is arranged on the first wiring by being spaced apart from the first electrode.

3. The semiconductor optical modulator according to claim 1, further comprising:
    another waveguide disposed on the substrate to form a pair of said waveguides extending in the first direction;
    an optical coupler disposed on the substrate, the optical coupler optically connecting said waveguides of the pair; and
    another second wiring disposed on the resin layer to form a pair of said second wirings extending in the first direction,
    wherein the pair of said waveguides is arranged between said second wirings of the pair thereof.

4. The semiconductor optical modulator according to claim 1, further comprising:
    a plurality of first electrodes disposed on the waveguide,
    a plurality of first wirings connected to corresponding of the first electrodes, and
    a plurality of build-up portions connected to corresponding of the first electrodes, wherein
    the first electrodes are spaced apart from each other, and
    the build-up portions are each connected with the second wiring.

5. The semiconductor optical modulator according to claim 1, further comprising a first insulating film composed of an inorganic silicon compound, the first insulating film disposed between the first resin layer and the second resin layer,
    wherein the first wiring is disposed on the first insulating film.

6. The semiconductor optical modulator according to claim 5, further comprising a second insulating film composed of an inorganic silicon compound, the second insulating film being disposed on the second resin layer,
    wherein the second wiring is disposed on the second insulating film.

7. The semiconductor optical modulator according to claim 1, wherein
    the build-up portion includes a barrier metal layer and an inner metal layer,
    the barrier metal layer is in contact with the resin layer, and
    the inner metal layer is in contact with a surface of the barrier metal layer.

8. The semiconductor optical modulator according to claim 1,
    wherein the waveguide includes a lower contact layer disposed on the principal surface of the substrate, a lower cladding layer disposed on the lower contact layer, a core layer disposed on the lower cladding layer, and an upper cladding layer disposed on the core layer, and
    wherein the lower contact layer has a larger width than a width of the core layer.

9. The semiconductor optical modulator according to claim 8, further comprising:
    an isolation mesa disposed on the principal surface of the substrate, the isolation mesa including the lower contact layer;
    a second electrode connected to an upper surface of the isolation mesa;
    a third wiring connected to the second electrode;
    a ground build-up portion connected to the third wiring; and
    a fourth wiring connected to the ground build-up portion,
    wherein the ground build-up portion extends along a fourth direction intersecting the principal surface of the substrate, and
    wherein the fourth wiring is disposed on the resin layer.

10. A method for manufacturing a semiconductor optical modulator, comprising the steps of:
    forming a waveguide on a principal surface of a substrate, the waveguide extending in a first direction;
    forming a first resin layer on the principal surface of the substrate, the first resin layer embedding the waveguide;
    forming a first opening in the first resin layer on the waveguide h etching the first resin layer;
    forming a first electrode in the first opening, the first electrode being in contact with an upper surface of the waveguide;

forming a first wiring on the first electrode and on the first resin layer, the first wiring having a portion extending in a second direction intersecting the first direction;

forming a second resin layer on the first wiring and on the first resin layer, the second resin layer embedding the first wiring;

forming a second opening in the second resin layer on the first wiring by etching the second resin layer, the second opening extending in a third direction intersecting the principal surface of the substrate; and forming a build-up portion in the second opening, and a second wiring on the second resin layer, simultaneously.

11. The method according to claim 10, wherein, in the step of forming the second opening, the second opening has a width smaller than a width of the first wiring.

12. The method according to claim 10, wherein, in the step of forming the second opening, the second opening is arranged on the first wiring by being spaced apart from the first electrode.

* * * * *